US012246317B2

(12) United States Patent
Lee et al.

(10) Patent No.: US 12,246,317 B2
(45) Date of Patent: Mar. 11, 2025

(54) MICROFLUIDIC TEST SYSTEM AND MICROFLUIDIC TEST METHOD

(71) Applicant: Chen-Yi Lee, Hsinchu (TW)

(72) Inventors: Chen-Yi Lee, Hsinchu (TW); Yun-Sheng Chan, Hualien (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 519 days.

(21) Appl. No.: 17/695,515

(22) Filed: Mar. 15, 2022

(65) Prior Publication Data

US 2022/0297120 A1 Sep. 22, 2022

Related U.S. Application Data

(60) Provisional application No. 63/240,225, filed on Sep. 2, 2021, provisional application No. 63/163,226, filed on Mar. 19, 2021.

(30) Foreign Application Priority Data

May 28, 2021 (TW) ................................ 110119564
Jan. 17, 2022 (TW) ................................ 111101835

(51) Int. Cl.
*G01N 9/04* (2006.01)
*B01L 3/00* (2006.01)

(52) U.S. Cl.
CPC . *B01L 3/502715* (2013.01); *B01L 2300/0645* (2013.01); *B01L 2300/0819* (2013.01); *B01L 2300/18* (2013.01)

(58) Field of Classification Search
CPC ....... B01L 3/502715; B01L 2300/0819; B01L 2300/0645; B01L 2300/18; G01N 9/04
See application file for complete search history.

(56) References Cited

U.S. PATENT DOCUMENTS

| | | | | |
|---|---|---|---|---|
| 8,815,070 | B2 * | 8/2014 | Wang | B01L 3/502792 422/81 |
| 8,828,736 | B2 | 9/2014 | Perroud et al. | |
| 9,873,129 | B1 | 1/2018 | Charlot | |
| 2011/0247938 | A1 | 10/2011 | Wang et al. | |
| 2017/0298283 | A1 | 10/2017 | Kapalka et al. | |

FOREIGN PATENT DOCUMENTS

| | | | |
|---|---|---|---|
| TW | 201525461 | A | 7/2015 |
| WO | WO 2021/041259 | A1 | 3/2021 |

OTHER PUBLICATIONS

Y. Ho et al., Design of a Micro-Electrode Cell for Programmable Lab-on-CMOS Platform, 2016 IEEE International Symposium on Circuits and Systems (ISCS), Montreal, QC, Canada, 2016, pp. 2871-2874.*
S. M. Khan et al., CMOS Enabled Microfluidic Systems for Healthcare Based Applications, 30 Adv. Mater. 1705759 (2018).*

* cited by examiner

*Primary Examiner* — Randy Boyer
(74) *Attorney, Agent, or Firm* — Christensen, Fonder, Dardi & Herbert PLLC

(57) ABSTRACT

A microfluidic test system and method are provided. The microfluidic test system includes a control apparatus and a microfluidic chip. The control apparatus stores a test protocol of a biomedical test. The microfluidic chip includes a top plate and a microelectrode dot array having a plurality of microelectrode devices connected in series. The control apparatus provides a location-sensing signal to the microfluidic chip so that each microelectrode device detects a capacitance value between the top plate and the corresponding microfluidic electrode accordingly. The control apparatus provides a clock signal to the microfluidic chip so that each microelectrode device outputs the corresponding capacitance value accordingly. The control apparatus determines the size and location of a test sample within the microfluidic chip, generates a control signal according to the test protocol, the size, and the location, and provides the control signal to the microfluidic chip.

18 Claims, 16 Drawing Sheets

MICROFLUIDIC TEST SYSTEM AND MICROFLUIDIC TEST METHOD

PRIORITY

This application claims priorities to U.S. Provisional Patent Application No. 63/163,226 filed on Mar. 19, 2021, Taiwan Patent Application No. 110119564 filed on May 28, 2021, U.S. Provisional Patent Application No. 63/240,255 filed on Sep. 2, 2021, and Taiwan Patent Application No. 111101835 filed on Jan. 17, 2022, which are hereby incorporated by reference in its entirety.

FIELD OF THE INVENTION

The present invention relates to microfluidic test systems and microfluidic test methods. More specifically, the present invention relates to microfluidic test systems and microfluidic test methods that provide accurate positioning and adaptive control.

BACKGROUND OF THE INVENTION

Compared to conventional biomedical equipment, adopting digital microfluidic biochips (DMFBs) in biomedical tests (e.g., protein analyses, disease diagnoses) offers several advantages, including equipment miniaturization, reaction volume reduction, low sample and reagent consumption, low cost, and clinical laboratory automation. Specifically, DMFBs with electrode arrays are powerful analysis platforms for biomedical tests, such as nucleic acid-based testing and drug-screening applications.

Conventional DMFBs typically use the electrowetting-on-dielectric (EWOD) technique to perform the microfluidic operation and provide an opportunity for clinical laboratory automation. Nevertheless, as the electrodes on conventional DMFBs are arranged in specific patterns for target-specific biomedical tests, they cannot be used for other biomedical tests once they have been designed. Consequently, digital microfluidic test equipment that is adaptive to the various biomedical tests and a microfluidic test technique that provides adaptive control in response to different biomedical tests are still in urgent need.

SUMMARY OF THE INVENTION

An objective of the present invention is to provide a microfluidic test system. The microfluidic test system comprises a control apparatus and a microfluidic chip. The control apparatus stores a test protocol of a biomedical test. The microfluidic chip comprises a top plate and a microelectrode dot array, wherein the microelectrode dot array is arranged under the top plate and comprises a plurality of microelectrode devices connected in a series. Each of the microelectrode devices comprises a microfluidic electrode, a multi-functional electrode, and a control circuit, wherein the microfluidic electrode is arranged under the top plate, the multi-functional electrode is arranged under the microfluidic electrode, and the control circuit is arranged under the multi-functional electrode. Each of the control circuits comprises a microfluidic control and location-sensing circuit, a storage circuit, and a temperature control circuit, wherein the microfluidic control and location-sensing circuit is coupled to the corresponding microfluidic electrode, and the temperature control circuit is coupled to the multi-functional electrode.

The control apparatus provides a location-sensing signal to the microfluidic chip, and the location-sensing signal is enabled within a first time interval. Each of the microfluidic control and location-sensing circuits detects a capacitance value between the top plate and the corresponding microfluidic electrode and stores the capacitance value in the corresponding storage circuit during the first time interval. The control apparatus further provides a clock signal to the microfluidic chip, and the clock signal is enabled within a plurality of sub-time intervals of a second time interval. The storage circuits output the capacitance values during the sub-time intervals of the second time interval respectively. The control apparatus further determines a size and a location of a test sample within the microfluidic chip according to the capacitance values, generates a test control signal according to the test protocol, the size, and the location, and provides the test control signal to the microfluidic chip.

Another objective of the present invention is to provide a microfluidic test method, which is for use in a control apparatus of a microfluidic test system to control a microfluidic chip. The control apparatus stores a test protocol of a biomedical test. The microfluidic chip comprises a top plate and a microelectrode dot array, wherein the microelectrode dot array is arranged under the top plate, and the microelectrode dot array comprises a plurality of microelectrode devices connected in a series. Each of the microelectrode devices comprises a microfluidic electrode, a multi-functional electrode, and a control circuit, wherein each of the microfluidic electrodes is arranged under the top plate, each of the multi-functional electrodes is arranged under the corresponding microfluidic electrode, and each of the control circuits is arranged under the corresponding multi-functional electrode. Each of the control circuits comprises a microfluidic control and location-sensing circuit, a storage circuit, and a temperature control circuit, wherein each of the microfluidic control and location-sensing circuits is coupled to the corresponding microfluidic electrode, and each of the temperature control circuits is coupled to the corresponding multi-functional electrode.

The microfluidic test method comprises the following step (a), step (b), step (c), step (d), step (e), and step (f). Step (a) provides, by the control apparatus, a location-sensing signal being enabled within a first time interval to the microfluidic chip so that each of the microfluidic control and location-sensing circuits detects a capacitance value between the top plate and the corresponding microfluidic electrode and stores the capacitance value in the corresponding storage circuit during the first time interval. Step (b) provides, by the control apparatus, a clock signal being enabled within a plurality of sub-time intervals of a second time interval to the microfluidic chip so that the storage circuits output the capacitance values during the sub-time intervals of the second time interval respectively. Step (c) receives, by the control apparatus, the capacitance values from the microfluidic chip. Step (d) determines, by the control apparatus, a size and a location of a test sample within the microfluidic chip according to the capacitance values. Step (e) generates, by the control apparatus, a test control signal according to the test protocol, the size, and the location. Step (f) provides, by the control apparatus, the test control signal to the microfluidic chip According to the microfluidic test technique provided by the present invention, a control apparatus may provide a location-sensing signal being enabled within a first time interval to a microfluidic chip so that each microfluidic control and location-sensing circuit in the microfluidic chip detects a capacitance value between a top plate and a corresponding microfluidic electrode and stores the capacitance value in a corresponding storage circuit during the first time interval. According to the microfluidic test technique provided by the present invention, the control apparatus may further provide a clock signal being enabled within a plurality of sub-time intervals of a second time interval to the microfluidic chip so that the storage circuits output the capacitance values during the sub-time intervals of the second time interval respectively. According to the microfluidic test technique provided by the present invention, the control apparatus may further determine a size and a location of a test sample within the microfluidic chip according to the capacitance values, generate a test control signal according to the test protocol, the size, and the location, and provide the test control signal to the microfluidic chip to perform a test operation.

Since the microfluidic test technique provided by the present invention can determine the size and the location of the test sample within the microfluidic chip and then generates the test control signal according to the size and the location of the test sample and the test protocol of the biomedical test that is going to perform, the microfluidic test technique provided by the present invention can perform accurate test operations for the various biomedical test.

The detailed technology and preferred embodiments implemented for the subject invention are described in the following paragraphs accompanying the appended drawings for a person having ordinary skill in the art to well appreciate the features of the claimed invention.

and

Figure 8:
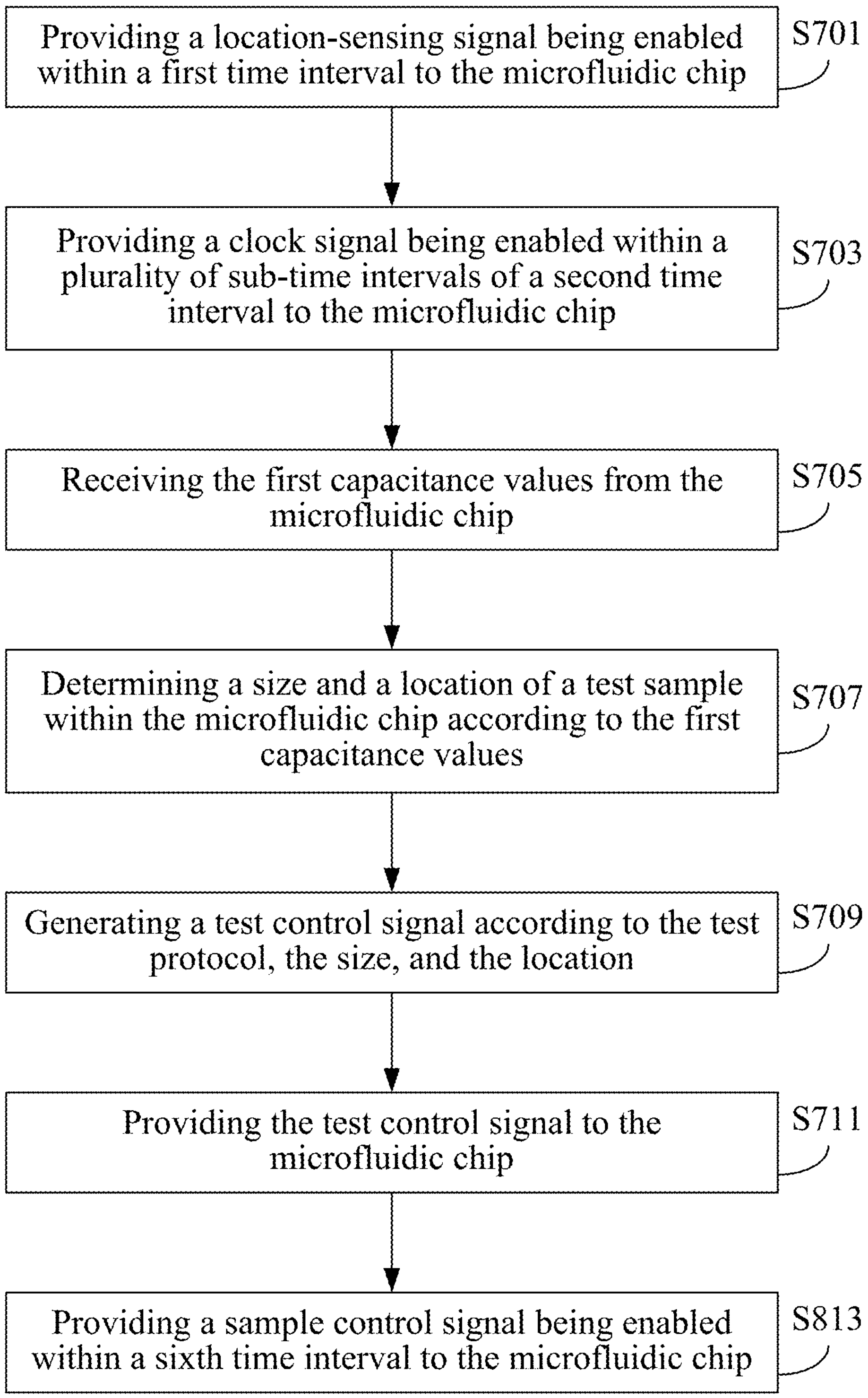

FIG. 8 illustrates the main flowchart of the microfluidic test method in an embodiment.

DETAILED DESCRIPTION

In the following descriptions, the microfluidic test systems and microfluidic test methods of the present invention will be explained regarding certain embodiments thereof. However, these embodiments are not intended to limit the present invention to any specific environment, application, or implementations described in these embodiments. Therefore, descriptions of these embodiments are to provide illustration rather than to limit the scope of the present invention. It should be noted that, in the following embodiments and the attached drawings, elements unrelated to the present invention are omitted from depiction. In addition, dimensions of elements and any dimensional scales between individual elements in the attached drawings are provided only for ease of depiction and illustration but not to limit the scope of the present invention.

Figure 1A:
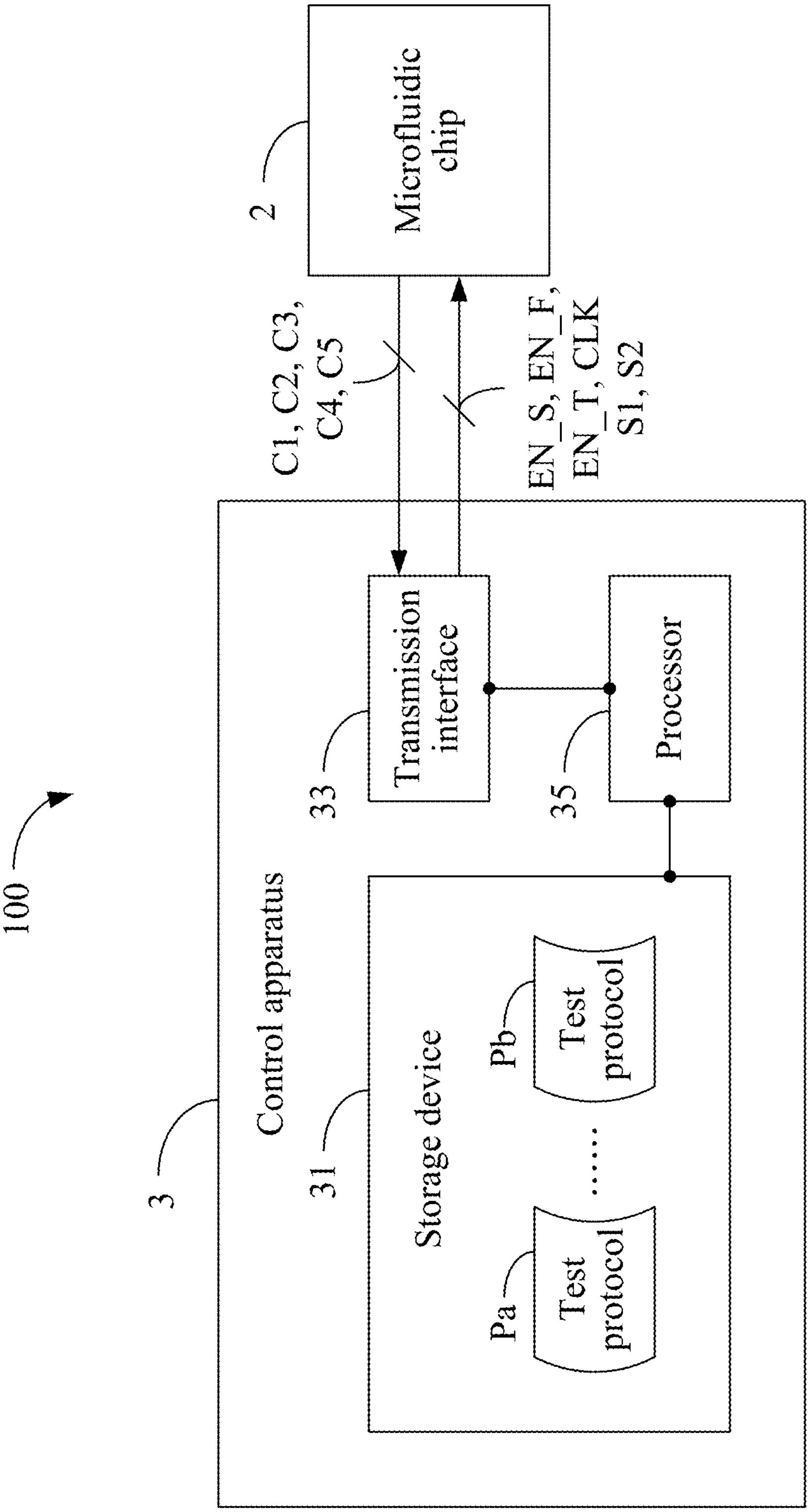
FIG. 1A illustrates the schematic view of the system architecture of a microfluidic test system in an embodiment.

An embodiment of the present invention is a microfluidic test system 100, and the schematic view of the system architecture is illustrated in FIG. 1A. The microfluidic test system 100 comprises a microfluidic chip 2 and a control apparatus 3, wherein the microfluidic chip 2 and the control apparatus 3 cooperate. In the following descriptions, hardware architectures of the microfluidic chip 2 and the control apparatus 3 will be given first, and operations performed by the microfluidic chip 2 and the control apparatus 3 for positioning test samples accurately and for achieving adaptive microfluidic test in response to different biomedical tests will then be given.

Figure 1B:
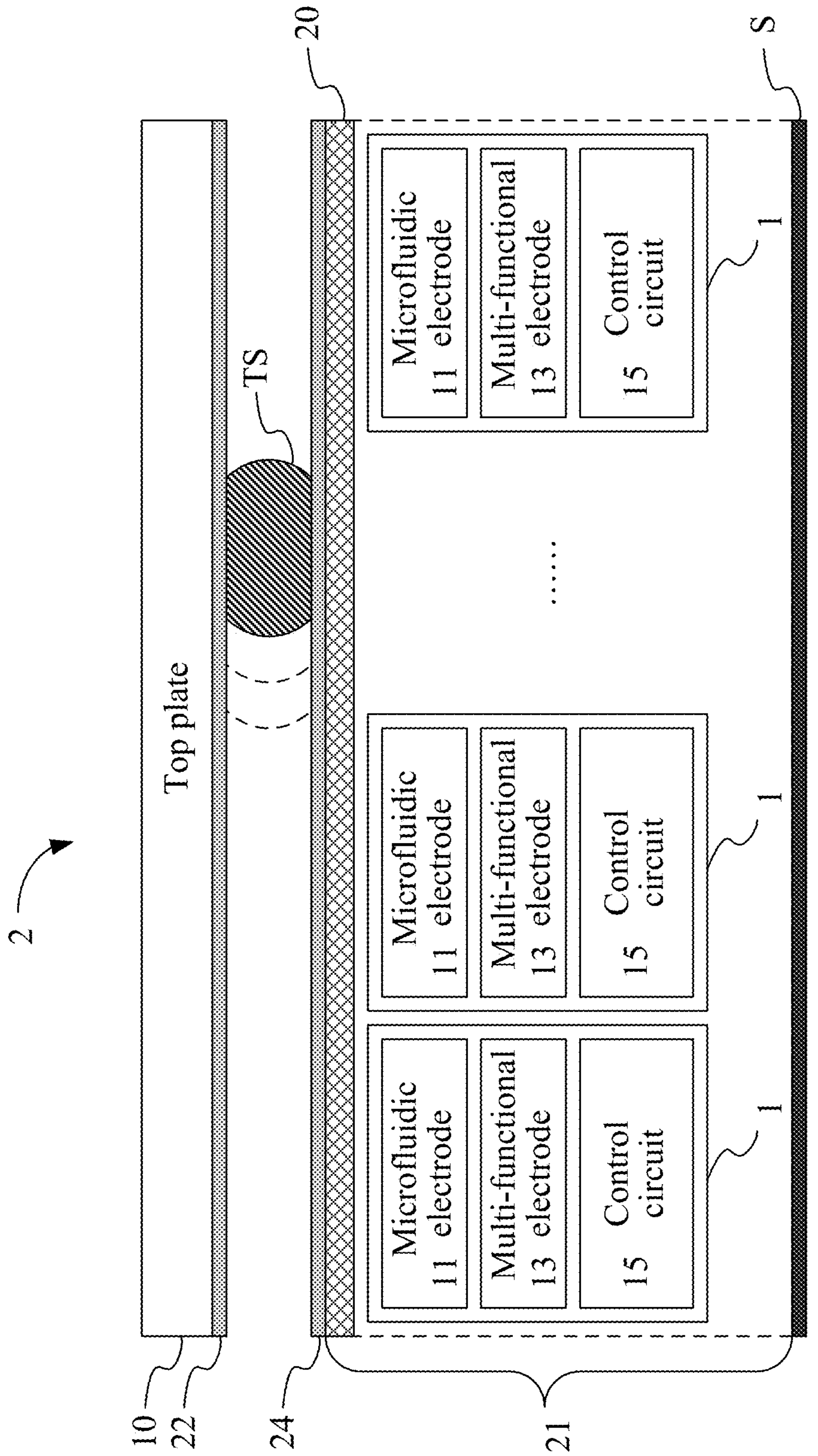
FIG. 1B illustrates the lateral view of the microfluidic chip.
Figure 1C:
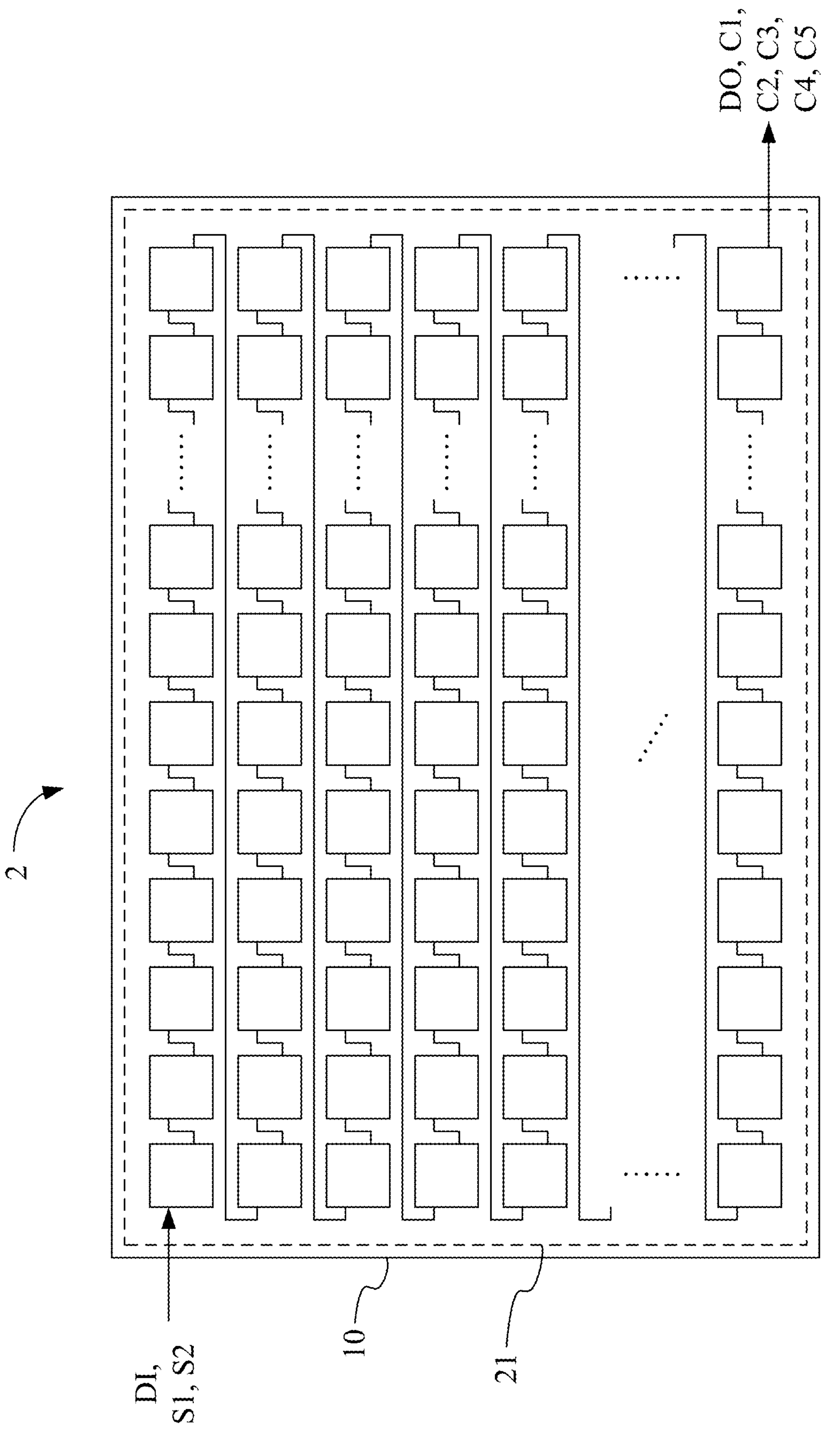
FIG. 1C illustrates the top view of the microfluidic chip.

The hardware architecture of the microfluidic chip 2 is described herein. FIG. 1B and FIG. 1C illustrate the lateral view and the top view of the microfluidic chip 2 respectively. The microfluidic chip 2 comprises a top plate 10 and a microelectrode dot array 21, wherein the microelectrode dot array 21 is arranged under the top plate 10. The top plate 10 can be formed by a conductive material, e.g., an Indium Tin Oxide (ITO) glass. A space is defined under the top plate 10 and above the microelectrode dot array 21, and a test sample TS can be moved within the space under the control of the control apparatus 3 (will be detailed later). In some embodiments, the microfluidic chip 2 may further comprise two hydrophobic layers 22, 24. The hydrophobic layer 22 is arranged under the top plate 10 and in contact with the top plate 10 directly, while the hydrophobic layer 24 is arranged above the microelectrode dot array 21. The space, for the test sample TS to be moved within, can be defined by the hydrophobic layers 22, 24. Each of the hydrophobic layers 22, 24 can be formed by a hydrophobic material.

The microelectrode dot array 21 comprises a plurality of microelectrode devices 1 connected in a series, wherein the microelectrode devices 1 are arranged in a two-dimensional array of the size p×q, wherein both p and q are positive integers greater than 1. The control apparatus 3 also knows that the microelectrode devices 1 are arranged in a two-dimensional array of the size p×q. Each microelectrode device 1 comprises a microfluidic electrode 11, a multi-functional electrode 13 (can be used as a heating electrode or an insulation layer depending on the test protocol under execution, will be detailed later), and a control circuit 15. Each microfluidic electrode 11 is arranged under the top plate 10, each multi-functional electrode 13 is arranged under the corresponding microfluidic electrode 11 (i.e., the microfluidic electrode 11 belonging to the same microelectrode device 1), and each control circuit 15 is arranged under the corresponding multi-functional electrode 13 (i.e., the multi-functional electrode 13 belonging to the same microelectrode device 1). In some embodiments, the microelectrode dot array 21 may further comprise a microelectrode interface 20 arranged above the microelectrode devices 1. The microelectrode interface 20 is used for interfacing the hydrophobic layer 24 and can be a $SiO_2$ insulation layer. Please note that the size of each microelectrode device 1 is not limited to any specific size in the present invention. Nevertheless, in some embodiments, the area of the top surface of each microelectrode device 1 can be 2,500 $\mu m^2$. Please also note that the distance between any two neighboring microelectrode devices 1 is not limited to any specific distance in the present invention. In some embodiments, the distance between a microelectrode device 1 and its neighboring microelectrode device 1 can be 1 μm.

In FIG. 1C, each square represents a microelectrode device 1, wherein each of the microelectrode devices 1 has an input terminal and an output terminal. For each of the microelectrode devices 1 except the first microelectrode device 1, the input terminal is coupled to the output terminal of the previous microelectrode device 1. Since the microelectrode devices 1 of the microfluidic chip 2 connect in a series, each of the microelectrode devices 1 except the first microelectrode device 1 receives the input signal DI (e.g., heating control configurations, sample operation configurations) through the microelectrode device(s) 1 arranged ahead, and each of the microelectrode devices 1 except the last microelectrode device 1 provides the output signal DO (e.g., the stored capacitance values) through the microelectrode device(s) 1 arranged behind.

Figure 1D:
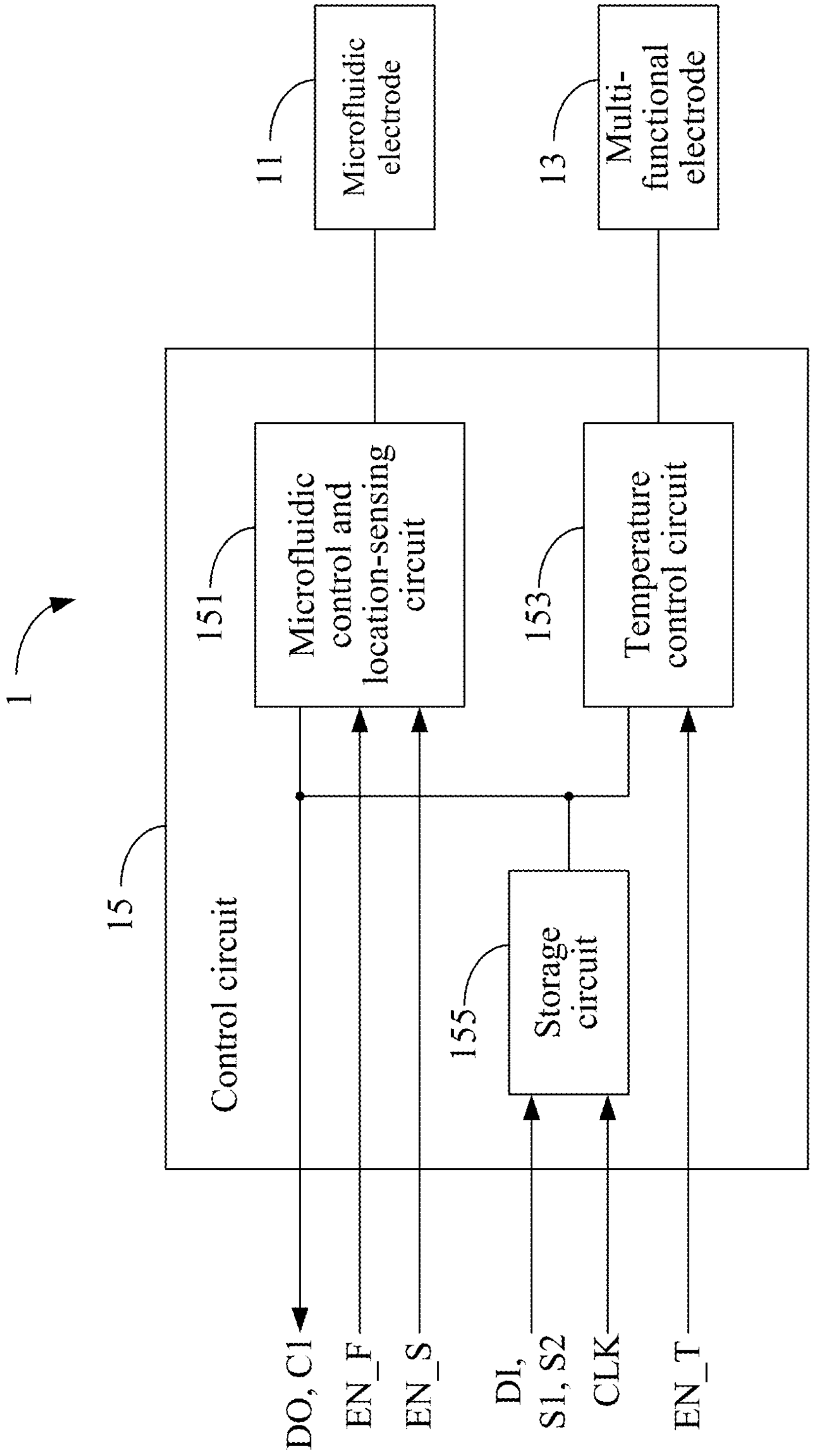
FIG. 1D illustrates the circuit block diagram of a microelectrode device.

FIG. 1D illustrates the circuit block diagram of each microelectrode device 1 of the microelectrode dot array 21. To be more specific, each microelectrode device 1 comprises a microfluidic electrode 11, a multi-functional electrode 13, and a control circuit 15, and the control circuit 15 of each microelectrode device 1 comprises a microfluidic control and location-sensing circuit 151, a temperature control circuit 153, and a storage circuit 155. Each microfluidic control and location-sensing circuit 151 is coupled to the corresponding microfluidic electrode 11 (i.e., the microfluidic electrode 11 belonging to the same microelectrode device 1), and each temperature control circuit 153 is coupled to the corresponding multi-functional electrode 13 (i.e., the multi-functional electrode 13 belonging to the same microelectrode device 1). The microfluidic control and location-sensing circuit 151, the temperature control circuit 153, and the storage circuit 155 within the same microelectrode device 1 are coupled to each other. Each microfluidic control and location-sensing circuit 151 may receive a sample control signal EN_F and a location-sensing signal EN_S. Each storage circuit 155 may receive a clock CLK, receive and store an input signal DI (e.g., heating control configurations, sample operation configurations), and provide an output signal DO (e.g., the stored capacitance values). Each temperature control circuit 153 may receive a heating control signal EN_T. Furthermore, a voltage signal VS (e.g., 1 kHz 50 Vp-p square wave) can be provided at the top of the top plate 10 to generate enough driving force by EWOD technique for moving the test sample in the space between the top plate 10 and the microelectrode dot array 21.

Figure 1E:
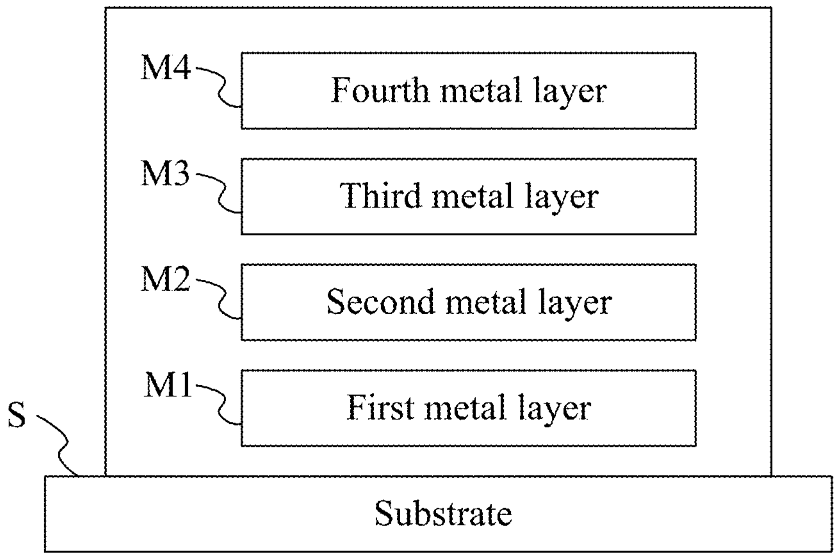
FIG. 1E illustrates a schematic view of a semiconductor structure having four metal layers.
Figure 1F:
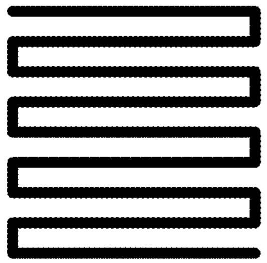
FIG. 1F illustrates a zigzag multi-functional electrode adopted in some embodiments.

In some embodiments, a semiconductor process (e.g., 0.35 μm 2P4M complementary metal-oxide semiconductor (CMOS) technology provided by Taiwan Semiconductor Manufacturing Company) that can form the semiconductor structure shown in FIG. 1E can be adopted to implement the microelectrode devices 1. The semiconductor structure shown in FIG. 1E comprises a substrate S and four metal layers on top of the substrate S, wherein the four metal layers include the first metal layer M1, the second metal layer M2, the third metal layer M3, and the fourth metal layer M4 from the bottom to the top. In those embodiments, the control circuits 15 of the microelectrode devices 1 can be formed at the first metal layer M1 and the second metal layer M2, the multi-functional electrodes 13 of the microelectrode devices 1 can be formed at the third metal layer M3, and the microfluidic electrodes 11 of the microelectrode devices 1 can be formed at the fourth metal layer M4. In some embodiments, to make the multi-functional electrodes 13 provide heat more evenly (when the multi-functional electrodes 13 serve as the heating electrodes), the shape of each multi-functional electrode 13 can be zigzag as shown in FIG. 1F.

The hardware architecture of the control apparatus 3 is described herein by making reference to FIG. 1A. The control apparatus 3 comprises a storage device 31, at least one transmission interface 33, and a processor 35, wherein processor 35 is electrically connected to the storage device 31 and the at least one transmission interface 33. The storage device 31 can be a memory, a Universal Serial Bus (USB) disk, a portable disk, a Hard Disk Drive (HDD), or any other non-transitory storage media, apparatus, or circuit with the same functions and well-known to a person having ordinary skill in the art. Each transmission interface 33 can be a digital input/output interface card that can communicate with a biochip and that is well-known to a person having ordinary skill in the art. The processor 35 can be one of the various processors, central processing units (CPUs), microprocessor units (MPUs), digital signal processors (DSPs), or other computing apparatuses well known to a person having ordinary skill in the art. In some embodiments, the control apparatus 3 can be a desktop computer, a notebook computer, or a mobile device (e.g., a tablet computer, a smartphone).

In the following descriptions, how the microfluidic chip 2 and the control apparatus 3 position a test sample TS accurately and perform the corresponding microfluidic test in response to different biomedical tests will be described in detail.

In this embodiment, the storage device 31 stores a plurality of test protocols Pa, . . . , Pb, wherein the test protocols Pa, . . . , Pb correspond to a plurality of biomedical tests respectively. As any biomedical test being executed has to follow the corresponding test protocol to achieve accurate test results, a test protocol of a biomedical test can be called a bio-protocol. Specifically, a test protocol of a biomedical test may comprise a sample volume of a test sample, at least one test temperature requirement (e.g., reaching a certain degree of temperature), at least one sample operation requirement (e.g., moving, classifying, cutting, mixing sample(s) for testing) and/or other requirements that a biomedical test has to follow. For example, if the test protocol Pa is for Polymerase Chain Reaction (PCR) test of a certain disease, the test protocol Pa may comprise a sample volume of a test sample, a test temperature requirement and a corresponding time interval for the Deoxyribonucleic Acid (DNA) denaturation stage, a test temperature requirement and a corresponding time interval for the annealing stage, and a test temperature requirement and a corresponding time interval for the extension stage. According to the present invention, there is no restriction on the number of the test protocols stored in the storage device 31 of the control apparatus 3 as long as there is at least one test protocol. It is appreciated that the more test protocols are stored in the storage device 31 of the control apparatus 3, the more biomedical tests can be performed by the microfluidic test system 100.

Figure 2A:
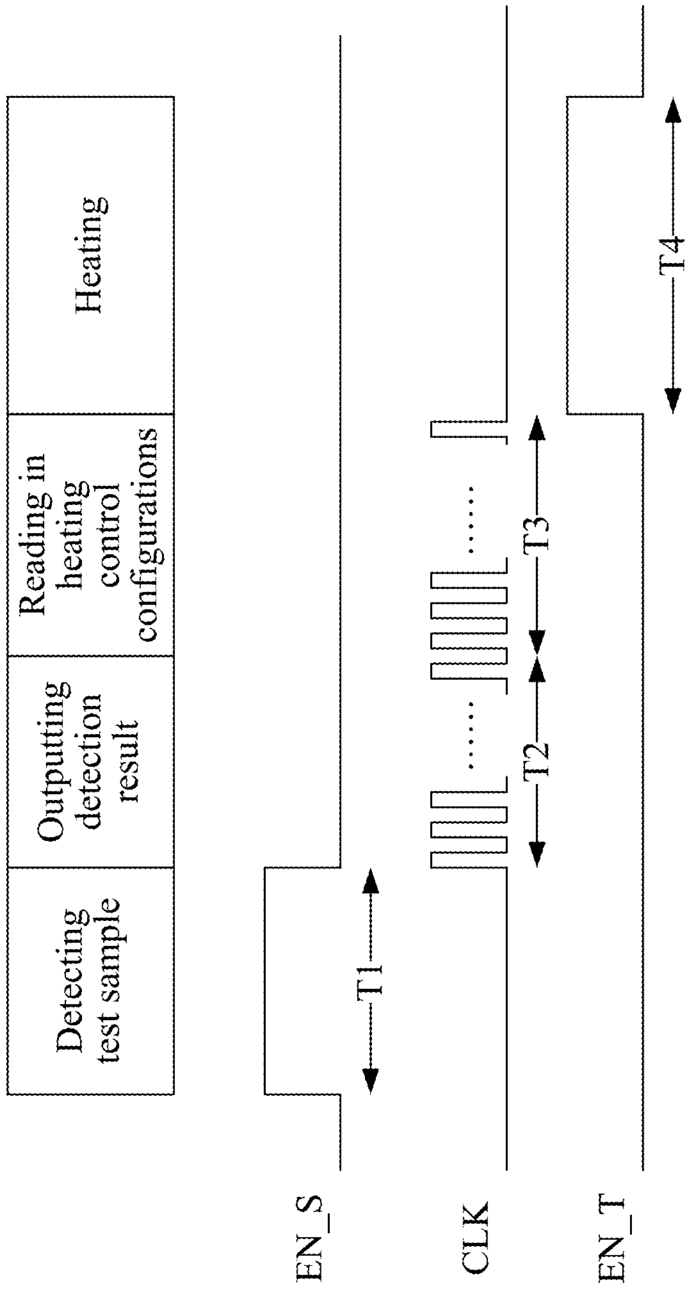
FIG. 2A illustrates a timing diagram that can be adopted when the test protocol of a biomedical test comprises test temperature requirement.

In some embodiments, the test protocol (e.g., the test protocol Pa) that corresponds to the biomedical test being executed by the microfluidic test system 100 comprises a test temperature requirement (e.g., the test environment has to be 95 degrees Celsius). For those embodiments, the control apparatus 3 may adopt the timing diagram as shown in FIG. 2A. The operations performed by the microfluidic test system 100 within the time intervals T1, T2 are for determining the size and the location of a test sample TS, and the operations performed by the microfluidic test system 100 within the time intervals T3, T4 are for providing a test control signal S1 according to the size of the test sample TS, the location of the test sample TS, and the test protocol of the biomedical test being executed.

To be more specific, the control apparatus 3 provides a location-sensing signal EN_S to the microfluidic chip 2 via the transmission interface 33, wherein the location-sensing signal EN_S is enabled within a time interval T1 (e.g., the voltage level of the location-sensing signal EN_S can be high within the time interval T1). Since the location-sensing signal EN_S is enabled within the time interval T1, the microfluidic control and location-sensing circuit 151 of each microelectrode devices 1 detects a first capacitance value between the top plate 10 and the corresponding microfluidic electrode 11 and stores the first capacitance value in the corresponding storage circuit 155 during the time interval T1. Each of the first capacitance values reflects whether there is a test sample between the top plate 10 and the corresponding microfluidic electrode 11. If using the numerical values “0” and “1” to indicate the detected capacitance value, the numerical value “1” can be used to indicate having a test sample between the top plate 10 and the microfluidic electrode 11 and the numerical value “0” can be used to indicate no test sample between the top plate 10 and the microfluidic electrode 11.

In addition, the control apparatus 3 provides a clock signal CLK to the microfluidic chip 2 via the transmission interface 33, wherein the clock signal CLK is enabled within a plurality of sub-time intervals of a time interval T2 (e.g., the voltage level of the clock signal CLK can be high within the sub-time intervals of the time interval T2). The sub-time intervals of the time interval T2 correspond to the storage circuits 155 of the microelectrode devices 1 one-to-one. That is, if the microelectrode dot array 21 comprises N microelectrode devices 1, the time interval T2 has N sub-time intervals, wherein N is a positive integer. Since the clock signal CLK is enabled within the sub-time intervals of the time interval T2, the storage circuits 155 output the first capacitance values C1 during the sub-time intervals of the time interval T2 respectively. The present invention does not restrict the clock rate of the clock signal CLK to any specific rate. For example, the storage circuits 155 may output the first capacitance values C1 under the setting that the clock rate of the clock signal CLK is 100 kHz.

Figure 2B:
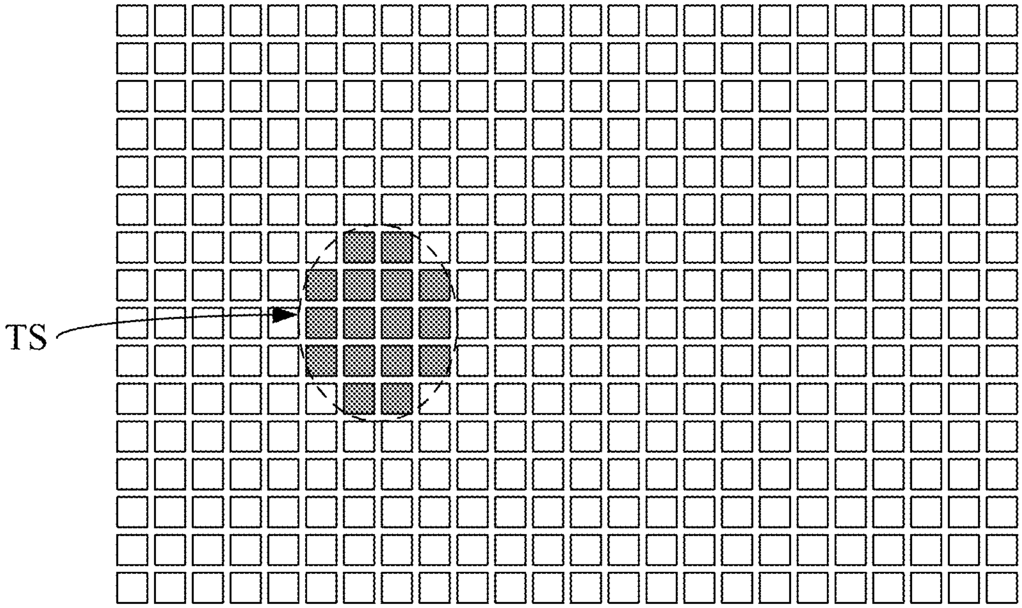
FIG. 2B illustrates the concept of determining the size and the location of a test sample according to the first capacitance values.

The control apparatus 3 receives the first capacitance values C1 via the transmission interface 33. The control apparatus 3 knows that the microelectrode devices 1 are arranged in a two-dimensional array of the size p×q and knows that the first capacitance values C1 correspond to the microelectrode devices 1 one-to-one. Please refer to a specific example shown in FIG. 2B for a better understanding, which illustrates the first capacitance values C1 being arranged a two-dimensional array of the size p×q. In FIG. 2B, the N squares respectively represent the first capacitance values of the N microelectrode devices 1, wherein each white square indicates that the corresponding first capacitance value is of the numerical value “0” and each grey square indicates that the corresponding first capacitance value is of the numerical value “1.” With the knowledge that the microelectrode devices 1 are arranged in a two-dimensional array of the size p×q, the processor 35 of the control apparatus 3 can determine the size and the location of the test sample TS within the microfluidic chip 2 according to the first capacitance values C1.

Afterwards, the processor 35 of the control apparatus 3 generates a test control signal S1 according to the test protocol (e.g., the test protocol Pa) of the biomedical test being executed, the size of the test sample TS, and the location of the test sample TS and provides the test control signal S1 to the microfluidic chip 2 via the transmission interface 33 to perform a corresponding test operation.

In the specific example shown in FIG. 2A, the test protocol of the biomedical test being executed comprises a test temperature requirement (e.g., the test environment has to be 95 degrees Celsius). Thus, the test control signal S1 comprises a plurality of heating control configurations (not shown), and the heating control configurations correspond to the microelectrode devices 1 one-to-one. Each of the heating control configurations is used to indicate an on/off status of the temperature control circuit 153 of the corresponding microelectrode 1 within a heating time interval (i.e., whether to perform heating).

To be more specific, the clock signal CLK that the control apparatus 3 provides to the microfluidic chip 2 is further enabled within a plurality of sub-time intervals of a time interval T3 (e.g., the voltage level of the clock signal CLK can be high within the sub-time intervals of the time interval T3). The sub-time intervals of the time interval T3 correspond to the storage circuits 155 of the microelectrode devices 1 one-to-one. The storage circuits 155 read in the heating control configurations during the sub-time intervals of the time interval T3 respectively.

In some embodiments, the processor 35 of the control apparatus 3 generates a heating control pattern according to the test temperature requirement of the test protocol Pa, the size of the test sample TS, and the location of the test sample TS and then generates the heating control configurations according to the heating control pattern. Please refer to a specific example shown in FIG. 2C for a better understanding. Regarding the heating control pattern H1 shown in FIG. 2C, the N squares respectively represent the N heating control configurations read in by the N storage circuits 155, wherein each grey square represents performing heating and each white represents not performing heating. The processor 35 of the control apparatus 3 then generates the heating control configurations according to the heating control pattern H1. For example, the heating control configuration corresponding to a white square can be of the numerical value “0” and the heating control configuration corresponding to a grey square can be of the numerical value “1.” FIG. 2D illustrates another heating control pattern 112 as another specific example.

In some embodiments, the heating control pattern generated by the control apparatus 3 may comprise a heating area and an annular non-heating area, wherein the annular non-heating area encompasses the heating area, and the location of the test sample TS corresponds to a center of the heating area. The annular non-heating area can be called a guard ring. By having a guard ring encompassing the heating area, the heating effect within the heating area will not be affected by the environment temperature outside. Therefore, the target temperature will be reached with a better temperature change rate and less energy consumption.

Figure 2C:
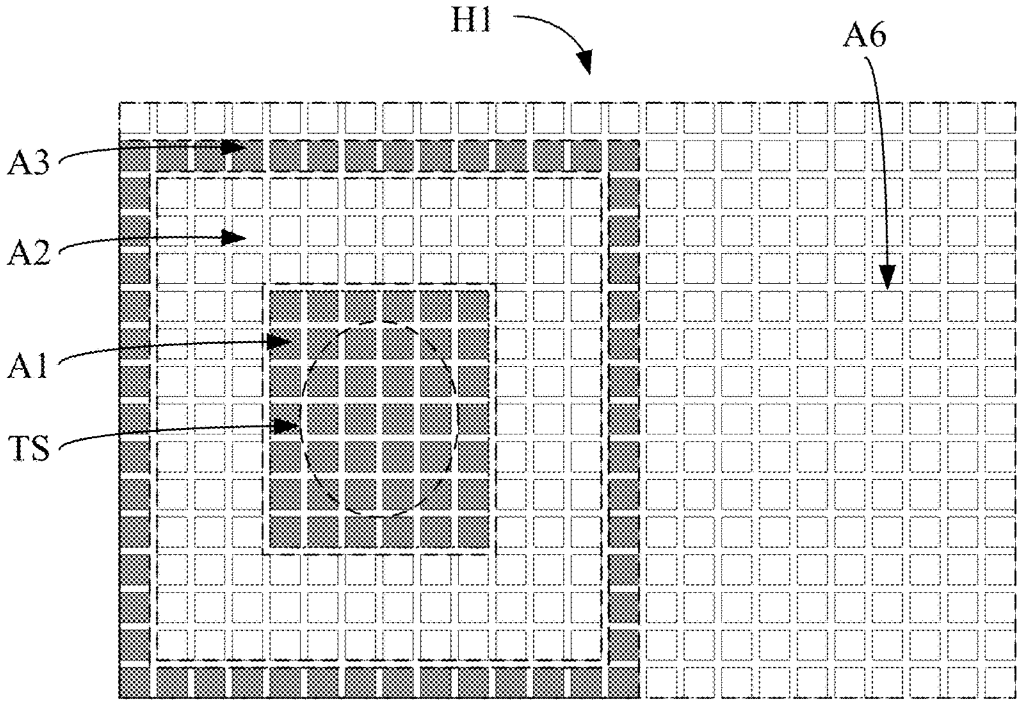
FIG. 2C illustrates the heating control pattern adopted in a specific example.
Figure 2D:
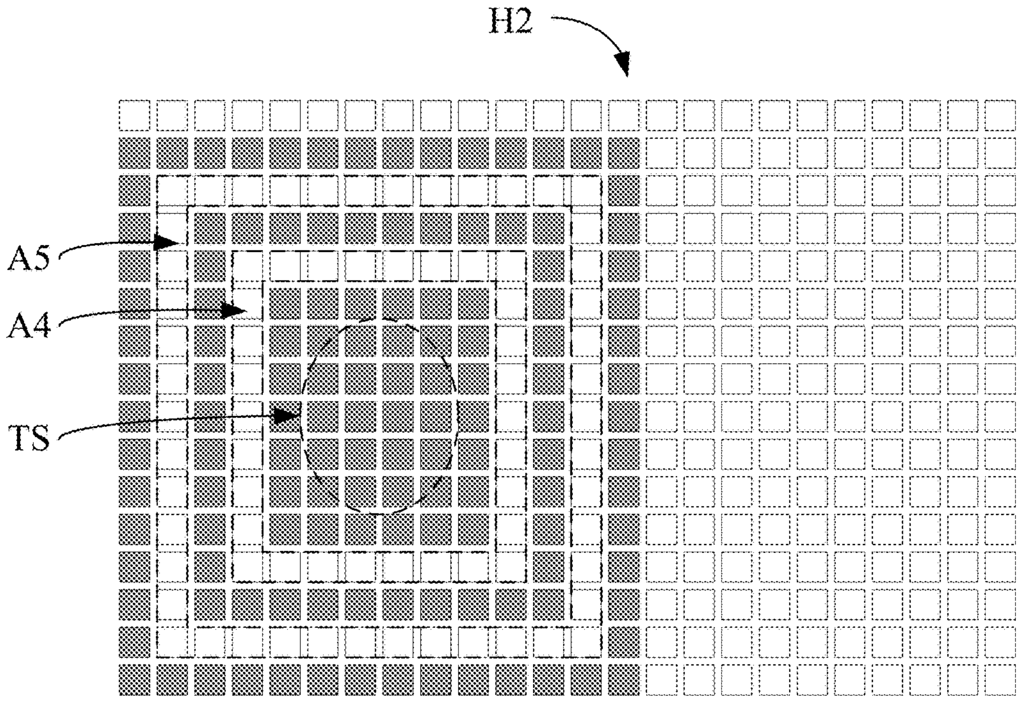
FIG. 2D illustrates the heating control pattern adopted in a specific example.

In the specific example shown in FIG. 2C, the heating control pattern H1 has a guard ring. To be more specific, the heating control pattern H1 comprises a heating area A1 (i.e., the grey squares that cover the test sample TS in FIG. 2C), an annular non-heating area A2 (i.e., the white squares that encompass the previously mentioned grey squares in FIG. 2C), another heating area A3 (i.e., the grey squares that encompass the previously mentioned white squares in FIG. 2C), and another non-heating area A6. The location of the test sample TS corresponds to the center of the heating area A1. The annular non-heating area A2 encompasses the heating area A1, another heating area A3 encompasses the annular non-heating area A2, and the rest area is the non-heating area A6. The number of the multi-functional electrodes (used as heating electrodes) within the heating area A1 and the heating area A3 depends on the test temperature requirement (i.e., the certain degree of temperature that has to reach) specified in the test protocol. The higher the required test temperature, the greater the number of the multi-functional electrodes within the heating area A1 and the heating area A3. The present invention does not restrict the number of annular non-hearing areas (i.e., the number of guard rings) within a heating control pattern to any specific number. In the specific example shown in FIG. 2D, the heating control pattern 112 has two guard rings (i.e., the annular non-heating areas A4, A5).

The control apparatus 3 provides a heating control signal EN_T to the microfluidic chip 2 via the transmission interface 33, wherein the heating control signal EN_T is enabled within a time interval T4 (e.g., the voltage level of the heating control signal EN_T can be high within the time interval T4). The time interval T4 is the previously mentioned heating time interval. Since the heating control signal EN_T is enabled within the time interval T4, the temperature control circuit 153 of each microelectrode device 1 determines an on/off status of itself (i.e., a switch comprised in the temperature control circuits 153 is on or off) according to the corresponding heating control configuration during the time interval T4. When a heating control configuration indicates the on/off status of the corresponding temperature control circuit 153 to be on (e.g., the heating control configuration is of the numerical value "1"), the temperature control circuit 153 lets its switch on during the time interval T4 (i.e., the heating time interval) so that the corresponding multi-functional electrode 13 performs heating (i.e., the multi-functional electrode 13 can be considered as a heating electrode in use). When a heating control configuration indicates the on/off status of the corresponding temperature control circuits 153 to be off (e.g., the heating control configuration is of the numerical value "0"), the temperature control circuit 153 lets its switch off during the time interval T4 (i.e., the heating time interval) so that the corresponding multi-functional electrode 13 does not function (i.e., does not perform heating, and the multi-functional electrode 13 can be considered as a heating electrode not in use).

By the aforementioned controls and operations, the microfluidic test system 100 can determine the size and the location of the test sample TS within the microfluidic chip 2 accurately and then provide adequate heating control configurations according to the size of the sample for test TS, the location of the sample for test TS, and the test protocol of the biomedical test being executed. Thus, the microfluidic test system 100 applies to the various kinds of biomedical tests that have test temperature requirements.

Figure 3A:
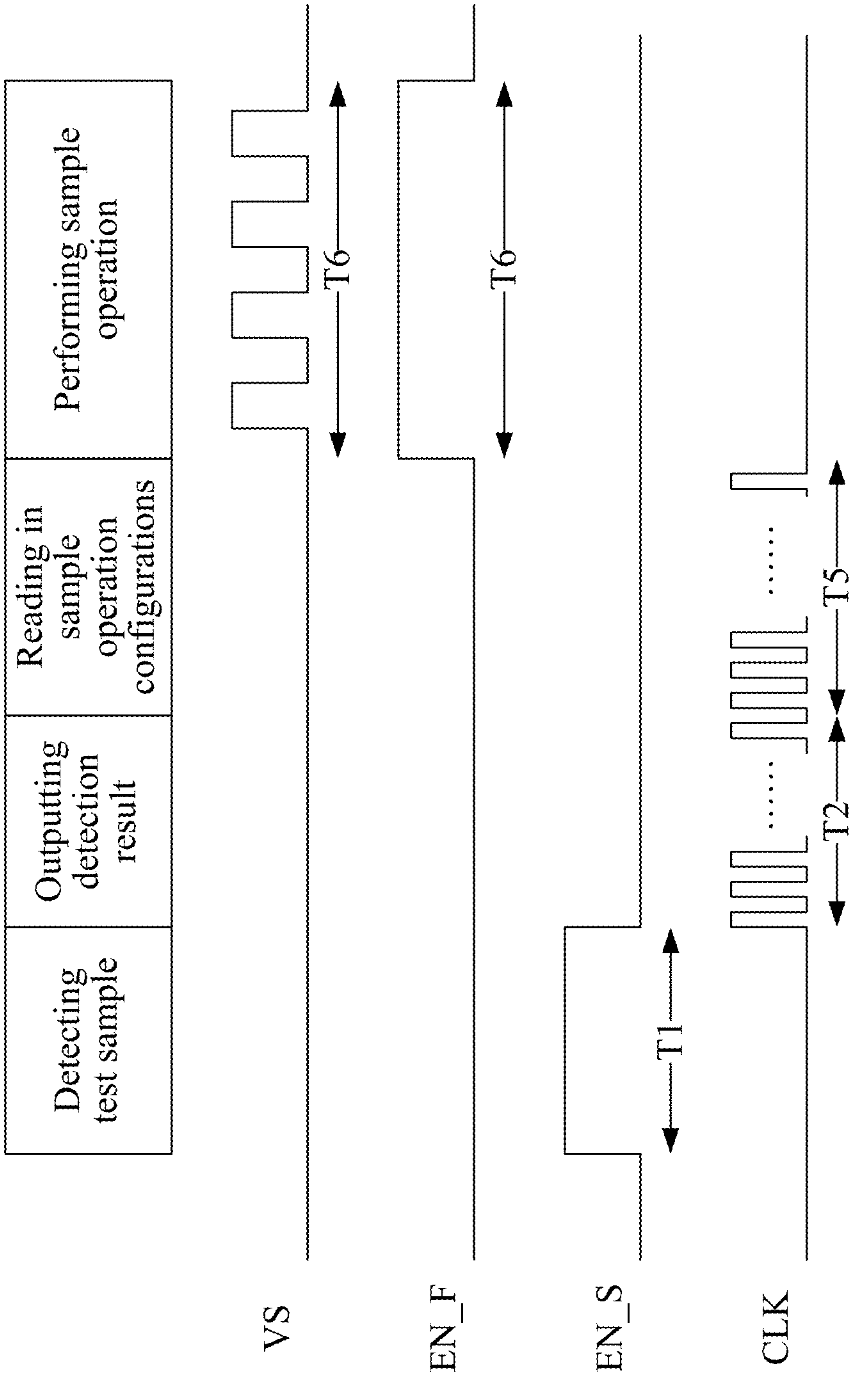
FIG. 3A illustrates a timing diagram that can be adopted when the test protocol of a biomedical test comprises sample operation requirement.

In some embodiments, the test protocol (e.g., the test protocol Pb) that corresponds to the biomedical test being executed by the microfluidic test system 100 comprises a sample operation requirement (e.g., cutting the test sample). For those embodiments, the control apparatus 3 may adopt the timing diagram as shown in FIG. 3A. The operations performed by the microfluidic test system 100 within the time intervals T1, T2 are for determining the size and the location of a test sample TS, and the operations performed by the microfluidic test system 100 within the time intervals T5, T6 are for providing a test control signal S2 according to the size and the location of the test sample TS and the test protocol of the biomedical test being executed.

Similar to the aforementioned embodiments, the control apparatus 3 provides the location-sensing signal EN_S to the microfluidic chip 2 via the transmission interface 33, wherein the location-sensing signal EN_S is enabled within a time interval T1. The microfluidic control and location-sensing circuit 151 of each microelectrode devices 1 detects a first capacitance value between the top plate 10 and the corresponding microfluidic electrode 11 and stores the first capacitance value in the corresponding storage circuit 155 during the time interval T1. Similarly, the control apparatus 3 provides a clock signal CLK to the microfluidic chip 2 via the transmission interface 33, wherein the clock signal CLK is enabled within a plurality of sub-time intervals of a time interval T2. The sub-time intervals of the time interval T2 correspond to the storage circuits 155 of the microelectrode devices 1 one-to-one. The storage circuits 155 output the first capacitance values C1 during the sub-time intervals of the time interval T2 respectively. Similarly, the control apparatus 3 receives the first capacitance values C1 via the transmission interface 33 and determines the size and the location of the test sample TS within the microfluidic chip 2 according to the first capacitance values C1.

Afterwards, the processor 35 of the control apparatus 3 generates a test control signal S2 according to the test protocol (e.g., the test protocol Pb) of the biomedical test being executed, the size of the test sample TS, and the location of the test sample TS and provides the test control signal S2 to the microfluidic chip 2 via the transmission interface 33 to perform a corresponding test operation.

In the specific example shown in FIG. 3A, the test protocol of the biomedical test being executed comprises a sample operation requirement (e.g., cutting a test sample). Thus, the test control signal S2 comprises a plurality of sample operation configurations (not shown), and the sample operation configurations correspond to the microelectrode devices 1 one-to-one. Each of the sample operation configurations is used to indicate the corresponding microfluidic control and location-sensing circuit 151 whether to function within a sample operation time interval.

To be more specific, the clock signal CLK that the control apparatus 3 provides to the microfluidic chip 2 is enabled within a plurality of sub-time intervals of a time interval T5 (e.g., the voltage level of the clock signal CLK can be high within the sub-time intervals of the time interval T5). The sub-time intervals of the time interval T5 correspond to the storage circuits 155 of the microelectrode devices 1 one-to-one. The storage circuits 155 read in the sample operation configurations during the sub-time intervals of the time interval T5 respectively.

Figure 3B:
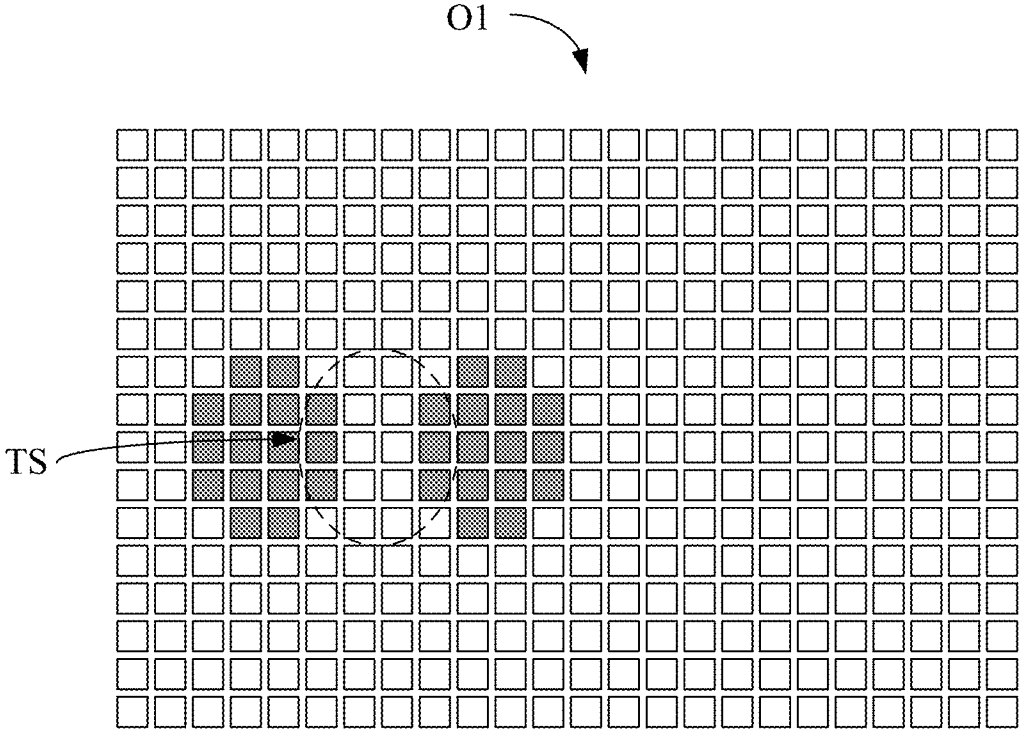
FIG. 3B illustrates the sample control pattern adopted in a specific example.

In some embodiments, the processor 35 of the control apparatus 3 generates a sample control pattern according to the sample operation requirement specified in the test protocol Pb, the size of the test sample TS, and the location of the test sample TS and then generates the sample operation configurations according to the sample control pattern. Please refer to a specific example shown in FIG. 3B for a better understanding. Regarding the sample control pattern O1 shown in FIG. 3B, the N squares respectively represent the N sample operation configurations read in by the N storage circuits 155, wherein each grey square represents performing sample operation and each white represents not performing sample operation. The processor 35 of the control apparatus 3 then generates the sample operation configurations according to the sample control pattern O1. For example, the sample operation configuration corresponding to a white square can be of the numerical value "0" and the sample operation configuration corresponding to a grey square can be of the numerical value "1."

The control apparatus 3 provides a sample control signal EN_F to the microfluidic chip 2 via the transmission interface, wherein the sample control signal EN_F is enabled within a time interval T6 (e.g., the voltage level of the sample control signal EN_F can be high within the time interval T6). In addition, the voltage level of the voltage signal VS provided to the top of the top plate 10 can be high during the time interval T6, and the voltage level of the voltage signal VS provided to the top of the top plate 10 is low during other time intervals. The time interval T6 is the previously mentioned sample operation time interval. Since the voltage level of the voltage signal VS provided to the top of the top plate 10 can be high during the time interval T6, the microfluidic control and location-sensing circuit 155 of each microelectrode device 1 functions or does not function according to the corresponding sample operation configuration during the time interval T6. During the sample operation time interval (i.e., the time interval T6), each multi-functional electrode 13 is an insulation layer (e.g., connecting to a low voltage level).

By the aforementioned controls and operations, the microfluidic test system 100 can determine the size and the location of the test sample TS within the microfluidic chip 2 accurately and then provide adequate sample operation configurations according to the size of the sample for test TS, the location of the sample for test TS, and the test protocol of the biomedical test being executed. Thus, the microfluidic test system 100 applies to the various kinds of biomedical tests that have sample operation requirements.

In some embodiments, if the test protocol of the biomedical test being executed further comprise a sample volume of the test sample, the control apparatus 3 may further determine whether the size of the test sample TS conforms to the sample volume specified in the test protocol after determining the size and the location of the test sample TS. If the size of the test sample TS conforms to the sample volume specified in the test protocol, the microfluidic test system 100 will then perform the subsequent operations. Taking FIG. 2A as an example, the microfluidic test system 100 may execute the operations corresponding to the time intervals T3, T4 after determining that the size of the test sample TS conforms to the sample volume specified in the test protocol. Taking FIG. 3A as another example, the microfluidic test system 100 may execute the operations corresponding to the time intervals T5, T6 after determining that the size of the test sample TS conforms to the sample volume specified in the test protocol.

Based on the descriptions of the above embodiments, a person having ordinary skill in the art shall appreciate that the control apparatus 3 may store test protocols corresponding to complicated biomedical tests (e.g., the test protocol of a biomedical test may comprise a sample volume of a test sample, several sample operation requirements, and several test temperature requirements, wherein the sample operation requirements and the test temperature requirements are arranged in a certain order). In addition, a person having ordinary skill in the art shall appreciate how the microfluidic test system 100 operates based on the test protocol to accomplish the biomedical test.

In some embodiments, the microfluidic test system 100 may further generate a three-dimensional image of the test sample TS. The microfluidic test system 100 may have each microelectrode device 1 be sampled at k sampling points individually, wherein k is a positive integer greater than 1. Please refer to FIG. 4A, which shows that only a portion of the space above the microelectrode device 1 has the test sample TS1 (e.g., a portion of the test sample TS). Therefore, sampling has to be performed at a plurality of sampling points p1, p2, p3, . . . , pk so that the real condition in the space above the microelectrode device 1 can be accurately reflected. To be more specific, the microfluidic test system 100 may determine a plurality of sampling points of a microelectrode device 1 by adjusting the sampling edge of the location-sensing signal EN_S. In some embodiments, the microfluidic test system 100 may further comprise a digitally programmable delay generator (DPDG). The DPDG determines the sampling edges of the location-sensing signal EN_S and thereby decide the sampling points.

To accomplish sampling at k different sampling points, the microfluidic test system 100 detects a test sample and outputs the result of detection repeatedly. For those embodiments, the control apparatus 3 may adopt the timing diagram as shown in FIG. 4B. To be more specific, the location-sensing signal EN_S that the control apparatus 3 provides to the microfluidic chip 2 is enabled within a sampling time t1 of a time interval T7 (e.g., the voltage level of the location-sensing signal EN_S can be high within the sampling time t1), wherein the sampling time t1 is deferred from a starting point of the time interval T7 for a defer time d1 so that the sampling time t1 corresponds to the sampling point p1 shown in FIG. 4A. Since the location-sensing signal EN_S is enabled within the sampling time t1 of the time interval T7, each of the microfluidic control and location-sensing circuits 151 detects a second capacitance value between the top plate 10 and the corresponding microfluidic electrode 11 and store the second capacitance value in the corresponding storage circuit 155 during the sampling time t1 of the time interval T7. Similarly, each of the second capacitance values reflects whether there is a test sample between the top plate 10 and the sampling point p1 of the corresponding microfluidic electrode 11.

The clock signal CLK that the control apparatus 3 provides to the microfluidic chip 2 is further enabled within a plurality of sub-time intervals of a time interval T8 (e.g., the voltage level of the clock signal CLK can be high within the sub-time intervals of the time interval T8). The sub-time intervals of the time interval T8 correspond to the storage circuits 155 of the microelectrode devices 1 one-to-one. Since the clock signal CLK is enabled within the sub-time intervals of the time interval T8, the storage circuits 155 output the second capacitance values C2 during the sub-time intervals of the time interval T8 respectively. The control apparatus 3 receives the second capacitance values C2 via the transmission interface 33.

Figure 4A:
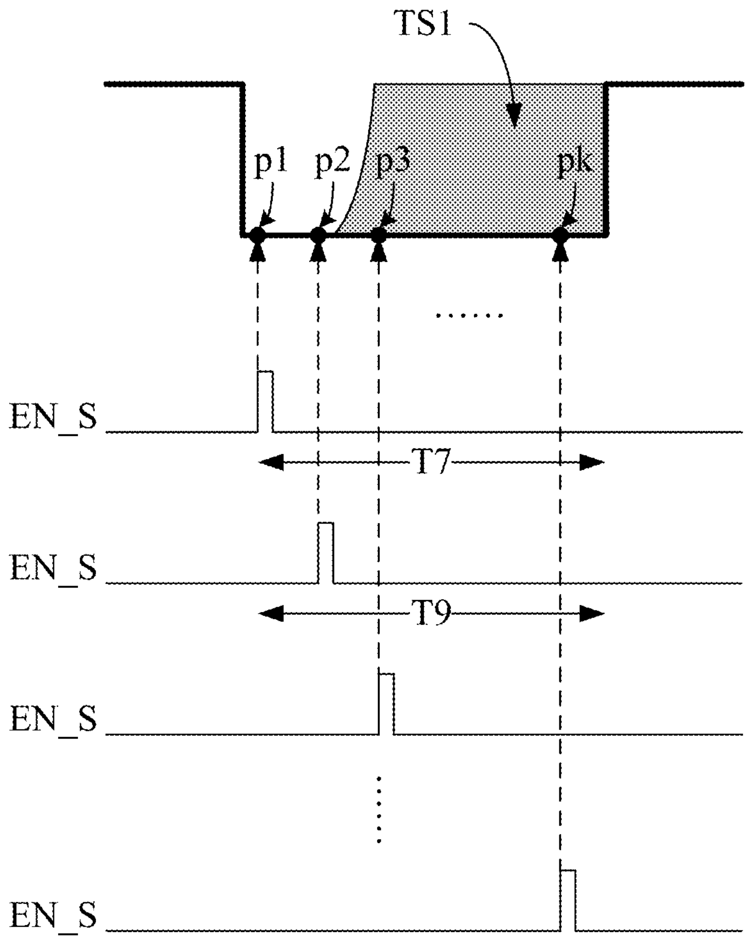
FIG. 4A illustrates a schematic view of a plurality of sampling points of a microelectrode device.
Figure 4B:
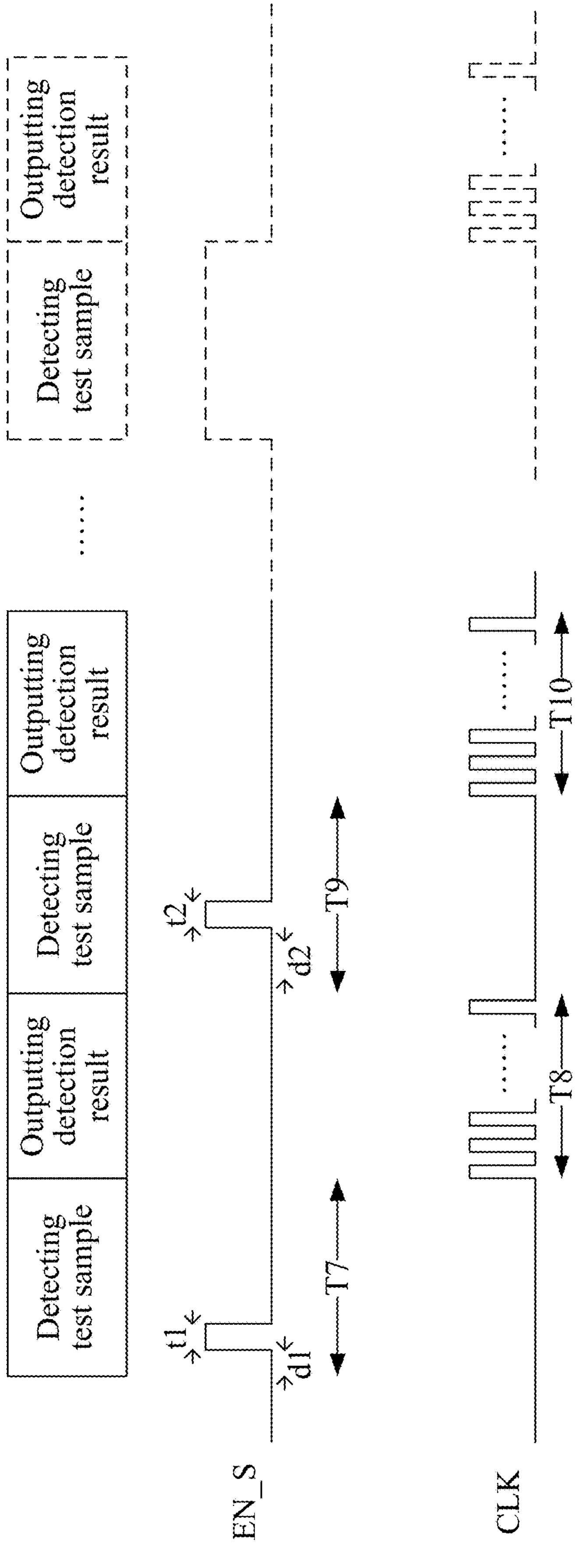
FIG. 4B illustrates a timing diagram that can be adopted for generating a three-dimensional image of a test sample.

The location-sensing signal EN_S that the control apparatus 3 provides to the microfluidic chip 2 is also enabled within a sampling time t2 of a time interval T9 (e.g., the voltage level of the location-sensing signal EN_S can be high within the sampling time t2), wherein the sampling time t2 is deferred from a starting point of the time interval T9 for a defer time d2 so that the sampling time t2 corresponds to the sampling point p2 shown in FIG. 4A. Since the location-sensing signal EN_S is enabled within the sampling time t2 of the time interval T9, each of the microfluidic control and location-sensing circuits 151 detects a third capacitance value between the top plate 10 and the corresponding microfluidic electrode 11 and store the third capacitance value in the corresponding storage circuit 155 during the sampling time t2 of the time interval T9. Similarly, each of the third capacitance values reflects whether there is a test sample TS between the top plate 10 and the sampling point p2 of the corresponding microfluidic electrode 11.

The clock signal CLK that the control apparatus 3 provides to the microfluidic chip 2 is also enabled within a plurality of sub-time intervals of a time interval T10 (e.g., the voltage level of the clock signal CLK can be high within the sub-time intervals of the time interval T10). The sub-time intervals of the time interval T10 correspond to the storage circuits 155 of the microelectrode devices 1 one-to-one. Since the clock signal CLK is enabled within the sub-time intervals of the time interval T10, the storage circuits 155 output the third capacitance values C3 during the sub-time intervals of the time interval T10 respectively. The control apparatus 3 receives the third capacitance values C3 via the transmission interface 33. With the knowledge that the microelectrode devices 1 are arranged in a two-dimensional array of the size p×q, the second capacitance values C2 correspond to the sampling points p1 of the microelectrode devices 1 one-to-one, and the third capacitance values 3 correspond to the sampling points p2 of the microelectrode devices 1 one-to-one, the control apparatus 3 generates a three-dimensional image (not shown) of the test sample TS according to the second capacitance values C2 and the third capacitance values C3.

By following the previously mentioned logic, the microfluidic test system 100 repeatedly detects for a test sample and outputs the result of detection for k times. Regarding the k time intervals for detecting test samples, the sampling times therein are deferred by different defer times so that the sampling times correspond to the k sampling points p1, p2, p3, . . . , pk. In a preferred embodiment, the k time intervals are of the same time length. After executing k times, the control apparatus 3 derives k two-dimensional one-bit images. Then, processor 35 of the control apparatus 3 generates the three-dimensional image of the test sample TS by combining (e.g., piling up) the k two-dimensional one-bit images.

Figure 5:
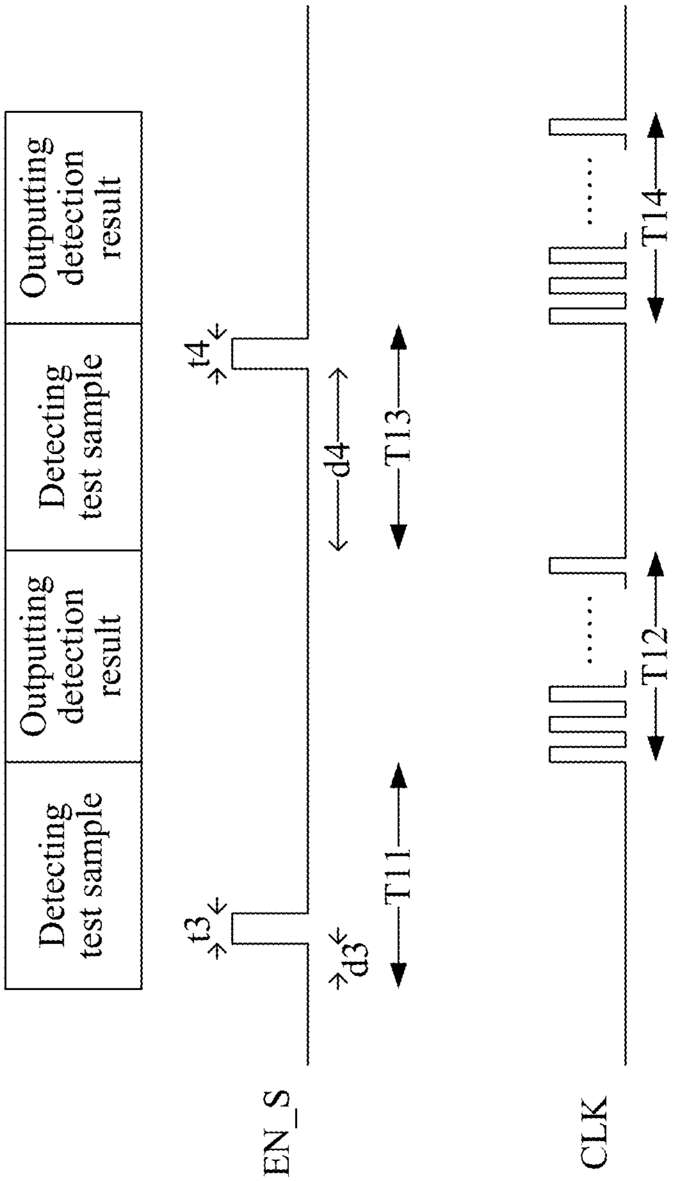
FIG. 5 illustrates a timing diagram that can be adopted for determining the status of each microelectrode device in the microfluidic chip 2.

In some embodiments, the microfluidic test system 100 may further determine the status of each microelectrode device 1 (i.e., whether each microelectrode device 1 can function normally) when the microfluidic chip 2 does not have any test sample (e.g., when the microfluidic test system 100 is booting up). For those embodiments, the control apparatus 3 may adopt the timing diagram as shown in FIG. 5.

To be more specific, the location-sensing signal EN_S that the control apparatus 3 provides to the microfluidic chip 2 is enabled within a sampling time t3 of a time interval T11 (e.g., the voltage level of the location-sensing signal EN_S can be high within the sampling time t3), wherein the sampling time t3 is deferred from a starting point of the time interval T11 for a defer time d3 so that the sampling time t3 corresponds to the sampling point p1 shown in FIG. 4A. Since the location-sensing signal EN_S is enabled within the sampling time t3 of the time interval T11, each of the microfluidic control and location-sensing circuits 151 detects a fourth capacitance value between the top plate 10 and the corresponding microfluidic electrode 11 and stores the fourth capacitance value in the corresponding storage circuit 155 during the sampling time t3 of the time interval T11. In addition, the clock signal CLK that the control apparatus 3 provides to the microfluidic chip 2 is enabled within a plurality of sub-time intervals of a time interval T12 (e.g., the voltage level of clock signal CLK can be high within the sub-time intervals of the time interval T12). Since the clock signal CLK is enabled within the sub-time intervals of the time interval T12, the storage circuits 155 output the fourth capacitance values C4 during the sub-time intervals of the time interval T12 respectively. The control apparatus 3 receives the fourth capacitance values C4 via the transmission interface 33.

The location-sensing signal EN_S that the control apparatus 3 provides to the microfluidic chip 2 is enabled within a sampling time t4 of a time interval T13 (e.g., the voltage level of the location-sensing signal EN_S can be high within the sampling time t4), wherein the sampling time t4 is deferred from a starting point of the time interval T13 for a defer time d4 so that the sampling time t4 corresponds to the sampling point pk shown in FIG. 4A. In a preferred embodiment, the time interval T11 and the time interval T13 can be of the same time length. Since the location-sensing signal EN_S is enabled within the sampling time t4 of the time interval T13, each of the microfluidic control and location-sensing circuits 151 detects a fifth capacitance value between the top plate 10 and the corresponding microfluidic electrode 11 and stores the fifth capacitance value in the corresponding storage circuit 155 during the sampling time t4 of the time interval T13. In addition, the clock signal CLK that the control apparatus 3 provides to the microfluidic chip 2 is enabled within a plurality of sub-time intervals of a time interval T14 (e.g., the voltage level of the clock signal CLK can be high within the sub-time intervals of the time interval T14). Since the clock signal CLK is enabled within the sub-time intervals of the time interval T14, the storage circuits 155 output the fifth capacitance values C5 during the sub-time intervals of the time interval T14 respectively. The control apparatus 3 receives the fifth capacitance values C5 via the transmission interface 33.

Then, for each of the microelectrode devices 1, the processor 35 of the control apparatus 3 determines the status of the microelectrode device 1 according to the fourth capacitance value C4 and the fifth capacitance value C5 corresponding to the microelectrode device 1. To be more specific, since there is no test sample TS in the microfluidic chip 2, the dielectric coefficient of the space between the top plate 10 and the microelectrode dot array 21 is the dielectric coefficient of air. These capacitance values are very small. If the sampling time of the location-sensing signal EN_S appears later (e.g., the sampling time t4 shown in FIG. 5, which corresponds to the sampling point pk shown in FIG. 4A), the electric charge between the top plate 10 and the microfluidic electrode 11 will be charged. As a result, the capacitance value that the microfluidic control and location-sensing circuits 151 detects between the top plate 10 and the microfluidic electrode 11 will be 1. If the sampling time of the location-sensing signal EN_S appears sooner (e.g., the sampling time t3 shown in FIG. 5, which corresponds to the sampling point p1 shown in FIG. 4A), the electric charge between the top plate 10 and the microfluidic electrode 11 cannot be charged. As a result, the capacitance value that the microfluidic control and location-sensing circuits 151 detects between the top plate 10 and the microfluidic electrode 11 will be 0. Therefore, if the microfluidic control and location-sensing circuit 151 of a microelectrode device 1 performs sampling at two different sampling times (i.e., performs sampling within two time intervals, wherein the sampling times in the two time intervals are deferred by different differed times), different capacitance values should be detected. Hence, for a microelectrode device 1, if the fourth capacitance value detected at the time interval T11 and the fifth capacitance value detected at the time interval T13 are the same, the processor 35 of the control apparatus 3 determines that microelectrode device 1 is being abnormal. On the contrary, for a microelectrode device 1, if the fourth capacitance value detected at the time interval T11 and the fifth capacitance value detected at the time interval T13 are different, the processor 35 of the control apparatus 3 determines that the microelectrode device 1 is normal.

After determining the status of each microelectrode device 1, the processor 35 of the control apparatus 3 may determine a workable area (i.e., the area formed by the normal microelectrode devices 1) of the microfluidic chip 2 according to the statuses. With the knowledge of the workable area of the microfluidic chip 2, the microfluidic test system 100 can perform the desired biomedical test on the test sample TS within the workable area of the microfluidic chip 2. Since the microelectrode devices 1 within the workable area of the microfluidic chip 2 are all normal, it is assured that the microfluidic test system 100 can provide accurate test results.

Figure 6:
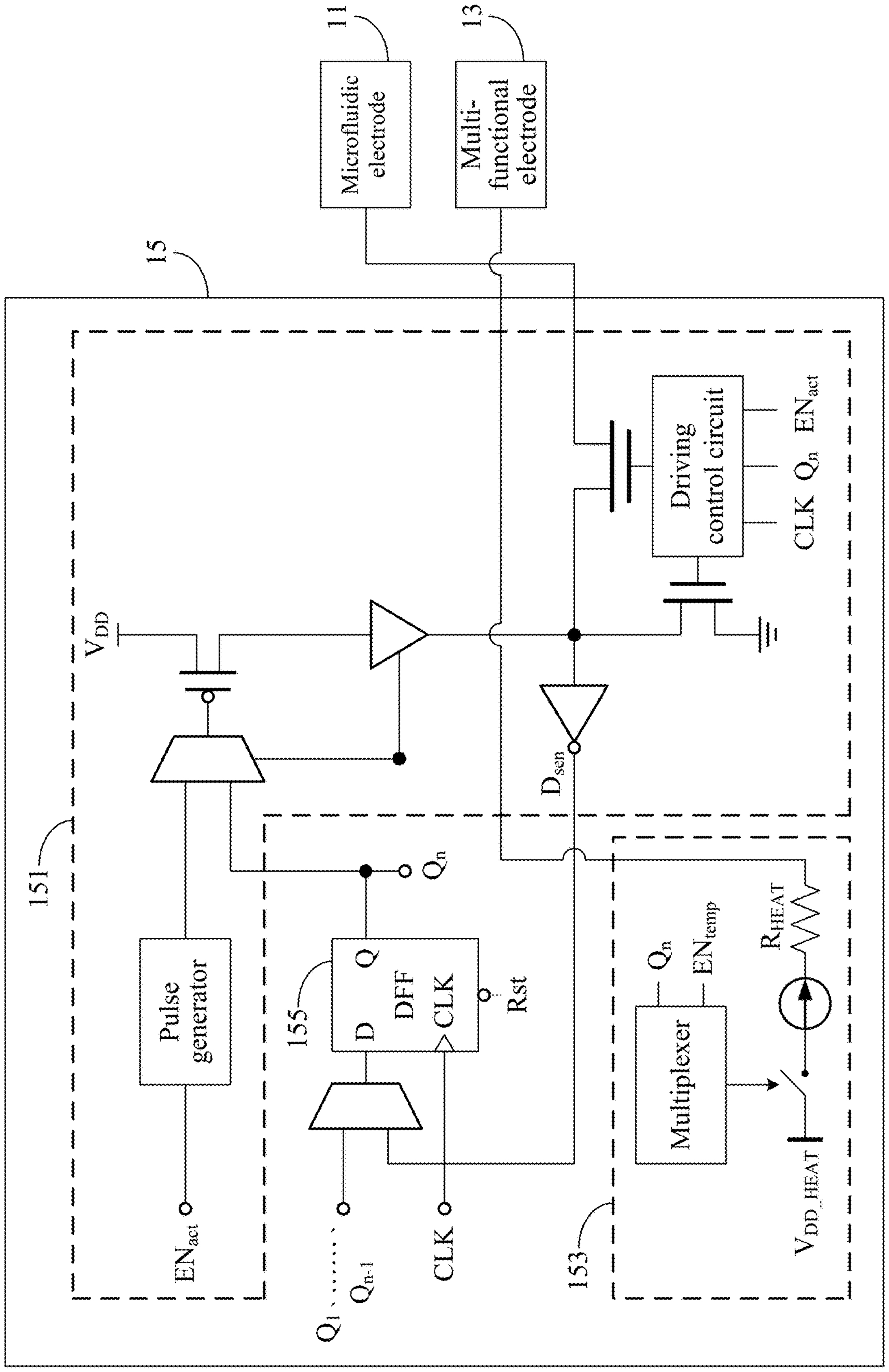
FIG. 6 illustrates the circuit diagram of the control circuit in a specific example.

In a specific example of the present invention, the circuit diagram of the control circuit 15 of a microelectrode device 1 is shown in FIG. 6. Please note that the circuit diagram shown in FIG. 6 is not intended to limit the scope of the present invention.

In this specific example, if it is going to perform a sample operation requirement specified in a test protocol, the value of the control signal $EN_{act}$ is 0 (being equivalent to the sample control signal EN_F being enabled), the value of the data signal $Q_n$ is the sample operation configuration read in by the microelectrode device 1, and the clock rate (e.g., can be set to 1K-10K Hz) of the clock signal CLK can be slower than the clock rate set for other operations. The microfluidic control and location-sensing circuits 151 will generate a pulling force to accomplish the sample operation on the test sample TS.

In this specific example, if it is going to detect the capacitance value between the top plate 10 and the microfluidic electrode 11, the value of the control signal $EN_{act}$ is 1 (being equivalent to the location-sensing signal EN_S being enabled), and the clock rate (e.g., can be set to 1M-10M Hz) of the clock signal CLK can be faster than the clock rate set for sample operations. The microfluidic control and location-sensing circuits 151 will output the detected capacitance value (i.e., the result of discharging the capacitance) as the detected result $D_{sen}$ and stores the detected result $D_{sen}$ in the storage circuit 155 (can be a D flip-flop) as the data signal $D_n$. As described above, the microelectrode devices 1 comprised in the microelectrode dot array 21 are connected in a series and, hence, the storage circuit 155 will receive the data signals $Q_1, \ldots, Q_{n-1}$ of the storage circuits 155 of other microelectrode devices 1 arranged ahead and then output them.

In this specific example, if it is going to perform a test temperature requirement specified in a test protocol, the value of the control signal $EN_{temp}$ is 1 (being equivalent to the heating control signal EN_T being enabled), and the value of the data signal $Q_n$ is the heating control configuration (e.g., the numerical value "0" represents not perform heating and the numerical value "1" represents perform heating) read in by the microelectrode device 1. The multiplexer in the temperature control circuit 153 will determine whether to conduct the switch therein according to the heating control signal EN_T and the data signal $Q_n$. If the switch in the temperature control circuit 153 is conducted, the current will pass the resistor $R_{HEAT}$ and the multifunctional electrode 13 and thereby achieve the result of heating up.

Figure 7:
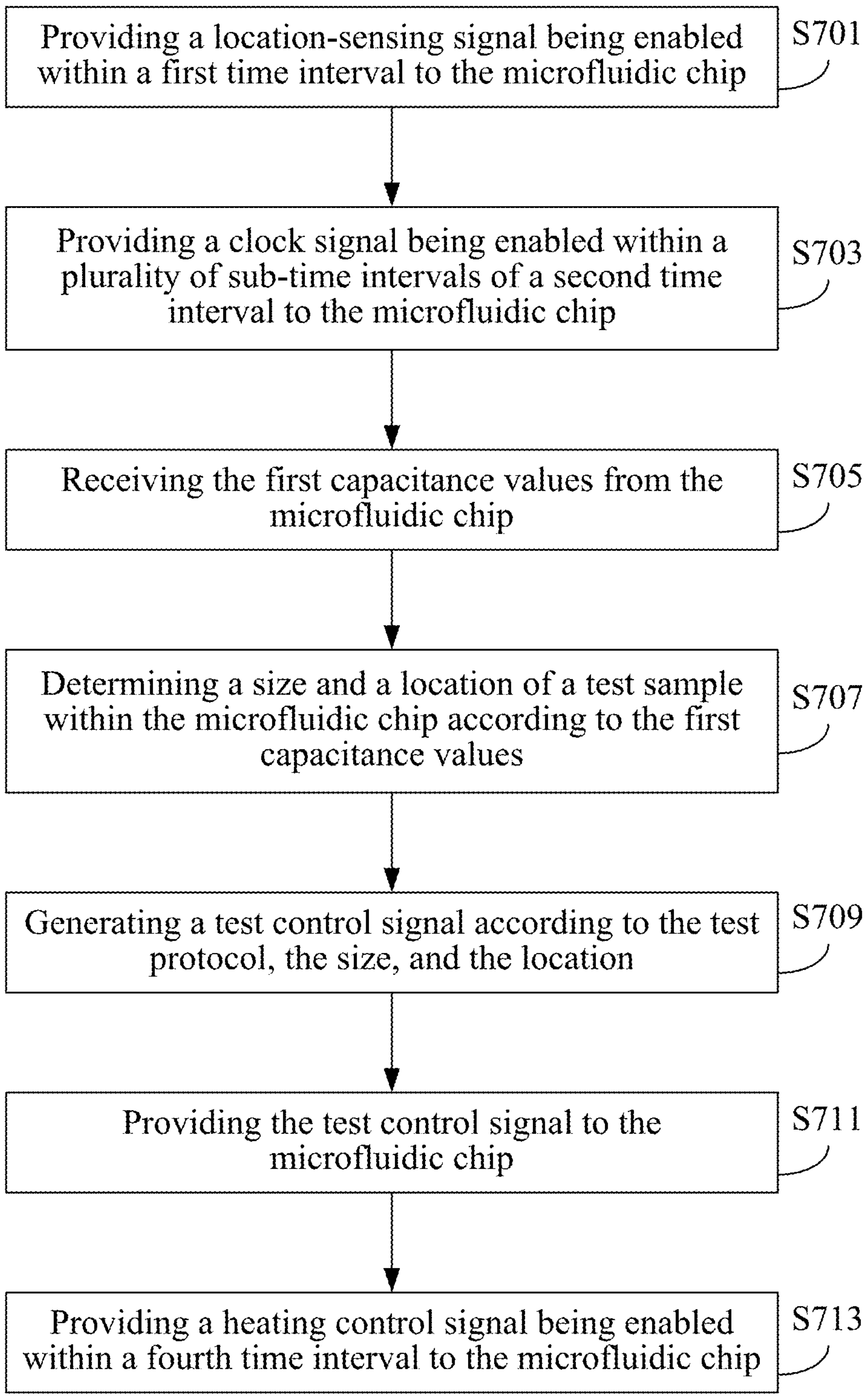
FIG. 7 illustrates the main flowchart of the microfluidic test method in an embodiment.

Another embodiment of the present invention is a microfluidic test method, which is for use in the control apparatus 3 of the microfluidic test system 100 to control the microfluidic chip 2. The main flowchart of the microfluidic test method is illustrated in FIG. 7, which at least comprises step S701, step S703, step S705, step S707, step S709, and step S711.

In step S701, the control apparatus 3 provides a location-sensing signal being enabled within a first time interval (e.g., the time interval T1 shown in FIG. 2A) to the microfluidic chip 2 so that each of the microfluidic control and location-sensing circuits 151 of the microfluidic chip 2 detects a first capacitance value between the top plate 10 and the corresponding microfluidic electrode 11 and stores the first capacitance value in the corresponding storage circuit 155 during the first time interval. In step S703, the control apparatus 3 provides a clock signal being enabled within a plurality of sub-time intervals of a second time interval (e.g., the time interval T2 shown in FIG. 2A) to the microfluidic chip 2 so that the storage circuits 155 of the microfluidic chip 2 output the first capacitance values during the sub-time intervals of the second time interval respectively. It is noted that the order for executing steps S701 and S703 is not limited by the present invention. Nevertheless, the second time interval appears later than the first time interval.

In step S705, the control apparatus 3 receives the first capacitance values from the microfluidic chip 2. In step S707, the control apparatus 3 determines the size and the location of a test sample within the microfluidic chip 2 according to the first capacitance values. In step S709, the control apparatus 3 generates a test control signal according to a test protocol of a biomedical test that has been stored, the size, and the location. In step S711, the control apparatus 3 provides the test control signal to the microfluidic chip 2 to perform a test operation.

In some embodiments, the test protocol of the biomedical test that the microfluidic test method is going to execute comprises a test temperature requirement. In those embodiments, the test control signal generated by step S709 comprises a plurality of heating control configurations, wherein the heating control configurations correspond to the microelectrode devices 1 of the microfluidic chip 2 one-to-one. In addition, the clock signal provided by step S703 is also enabled within a plurality of sub-time intervals of a third time interval (e.g., the time interval T3 shown in FIG. 2A) so that the storage circuits 155 read in the heating control configurations during the sub-time intervals of the third time interval respectively. The previously mentioned third time interval appears later than the previously mentioned second time interval. In those embodiments, the microfluidic test method further comprises step S713. In step S713, the control apparatus 3 provides a heating control signal being enabled within a fourth time interval (e.g., the time interval T4 shown in FIG. 2A) to the microfluidic chip 2 so that each of the temperature control circuits determines an on/off status of the corresponding temperature control circuit (i.e., itself) according to the corresponding heating control configuration during the fourth time interval. The previously mentioned fourth time interval appears later than the previously mentioned third time interval.

In some embodiments, step S713 may generate a heating control pattern according to the test protocol, the size, and the location and then generates the heating control configurations according to the heating control pattern. In addition, in some embodiments, the heating control pattern may comprise a heating area and an annular non-heating area, wherein the annular non-heating area encompasses the heating area, and the location of the test sample corresponds to a center of the heating area. The previously mentioned annular non-heating area can be called a guard ring. By having a guard ring encompassing the heating area, the heating effect within the heating area will not be affected by the environment temperature outside. Therefore, the target temperature will be reached with a better temperature change rate and less energy consumption.

In some embodiments, the test protocol of the biomedical test that the microfluidic test method is going to execute comprises a sample operation requirement and the main flowchart of the microfluidic test method is illustrated in FIG. 8. In those embodiments, the test control signal generated by step S709 comprises a plurality of sample operation configurations, wherein the sample operation configurations correspond to the microelectrode devices one-to-one. Furthermore, the clock signal provided by step S703 is enabled within a plurality of sub-time intervals of a fifth time interval (e.g., the time interval T5 shown in FIG. 3A). The storage circuits read in the sample operation configurations during the sub-time intervals of the fifth time interval respectively. The previously mentioned fifth time interval appears later than the previously mentioned second time interval. In those embodiments, the microfluidic test method further comprises step S813. In step S813, the control apparatus 3 provides a sample control signal being enabled within a sixth time interval (e.g., the time interval T6 shown in FIG. 3A) to the microfluidic chip 2 so that each of the microfluidic control and location-sensing circuits 151 functions or does not function according to the corresponding sample operation configuration during the sixth time interval. The previously mentioned sixth time interval appears later than the previously mentioned fifth time interval. In some embodiments, step S813 generates a sample control pattern according to the test protocol, the size, and the location and then generates the sample operation configurations according to the sample control pattern.

In some embodiments, the microfluidic test method may further generate a three-dimensional image of the test sample within the microfluidic chip 2.

In those embodiments, the location-sensing signal is enabled within a first sampling time of a seventh time interval (e.g., the sampling time t1 of the time interval T7 shown in FIG. 4B) so that each of the microfluidic control and location-sensing circuits 151 detects a second capacitance value between the top plate 10 and the corresponding microfluidic electrode 11 and stores the second capacitance value in the corresponding storage circuit 151 during the first sampling time of the seventh time interval. The clock signal is enabled within a plurality of sub-time intervals of an eighth time interval (e.g., the time interval T8 shown in FIG. 4B) so that the storage circuits 155 output the second capacitance values during the sub-time intervals of the eighth time interval respectively. The location-sensing signal is also enabled within a second sampling time of a ninth time interval (e.g., the sampling time t1 of the time interval T9 shown in FIG. 4B). Hence, each of the microfluidic control and location-sensing circuits 151 detects a third capacitance value between the top plate 10 and the corresponding microfluidic electrode 11 and stores the third capacitance value in the corresponding storage circuit 155 during the second sampling time of the ninth time interval. It is noted that the first sampling time is deferred from a first starting point of the seventh time interval for a first defer time, the second sampling time is deferred from a second starting point of the ninth time interval for a second defer time, and the first defer time and the second defer time are different. In a preferred embodiment, the seventh time interval and the ninth time interval can be of the same time length. The clock signal is also enabled within a plurality of sub-time intervals of a tenth time interval (e.g., the time interval T10 shown in FIG. 4B) so that the storage circuits 155 output the third capacitance values during the sub-time intervals of the tenth time interval.

In those embodiments, the microfluidic test method further comprises a step for receiving the second capacitance values by the control apparatus 3, another step for receiving the third capacitance values by the control apparatus 3, and another step for generating a three-dimensional image of the test sample according to the second capacitance values and the third capacitance values by the control apparatus 3.

In some embodiments, the microfluidic test method may further determine the status of each microelectrode device 1 (i.e., whether each microelectrode device 1 can function normally) when the microfluidic chip 2 does not have any test sample (e.g., when the microfluidic test system is booting up).

In those embodiments, the location-sensing signal is enabled within a first sampling time of an eleventh time interval (e.g., the sampling time t3 of the time interval T11 shown in FIG. 5) so that each of the microfluidic control and location-sensing circuits 151 detects a fourth capacitance value between the top plate 10 and the corresponding microfluidic electrode 11 and stores the fourth capacitance value in the corresponding storage circuit 155 during the first sampling time of the eleventh time interval. The clock signal is enabled within a plurality of sub-time intervals of a twelfth time interval (e.g., the time interval T12 shown in FIG. 5) so that the storage circuits 155 output the fourth capacitance values during the sub-time intervals of the twelfth time interval respectively. The location-sensing signal is also enabled within a second sampling time of a thirteenth time interval (e.g., the sampling time t4 of the time interval T13 shown in FIG. 5) so that each of the microfluidic control and location-sensing circuits 151 detects a fifth capacitance value between the top plate 10 and the corresponding microfluidic electrode 11 and stores the fifth capacitance value in the corresponding storage circuit 155 during the second sampling time of the thirteenth time interval. It is noted that the first sampling time is deferred from a first starting point of the eleventh time interval for a first defer time, the second sampling time is deferred from a second starting point of the thirteenth time interval for a second defer time, and the first defer time is different to the second defer time. In a preferred embodiment, the eleventh time interval and the thirteenth time interval can be of the same time length. The clock signal is also enabled within a plurality of sub-time intervals of a fourteenth time interval (e.g., the time interval T14 shown in FIG. 5) so that the storage circuits 155 output the fifth capacitance values during the sub-time intervals of the fourteenth time interval.

In those embodiments, the microfluidic test method further comprises a step for receiving the fourth capacitance values by the control apparatus 3, another step for receiving the fifth capacitance values by the control apparatus, and another step for determining the status of each of the microelectrode device according to the corresponding fourth capacitance value and the corresponding fifth capacitance value by the control apparatus 3. In some embodiments, the microfluidic test method may further comprise a step for determining a workable area of the microfluidic chip according to the statuses by the control apparatus 3.

In addition to the previously mentioned steps, the microfluidic test method provided by the present invention can execute other steps so that the control apparatus 3 can control the microfluidic chip 2 to have the same functions and deliver the same technical effects as those described in the second embodiment. How the microfluidic test method provided by the present invention executes those operations and steps, has the same functions, and delivers the same technical effects will be readily appreciated by a person having ordinary skill in the art based on the above explanation of the previously mentioned embodiments, and thus will not be further described herein.

It shall be appreciated that, in the specification and the claims of the present invention, some terms (including time interval, capacitance value, sampling time) are preceded by the terms "first," "second," . . . , or "fourteenth." Please note that the terms "first," "second," . . . , and "fourteenth" are used only for distinguishing different terms. If the order of these terms is not specified or the order of the terms cannot be derived from the context, the order of these terms is not limited by the preceded "first," "second," . . . , or "fourteenth."

According to the above descriptions, the microfluidic test technique provided by the present invention can determine the size and the location of a test sample within a microfluidic chip and then generate a test control signal according to the test protocol of a biomedical test that is going to execute, the size of the test sample, and the location of the test sample. In addition, the microfluidic test technique provided by the present invention can generate a three-dimensional image of the test sample. Moreover, to ensure that accurate test results can be provided, the microfluidic test technique provided by the present invention can further determine the status of each microelectrode device of the microfluidic chip when the microfluidic chip does not have any test sample and then determine a workable area of the microfluidic chip. Hence, the microfluidic test technique provided by the present invention can perform accurate test operations for the various biomedical test.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have been substantially covered in the following claims as appended.

What is claimed is:

1. A microfluidic test system, comprising:

a control apparatus, storing a test protocol of a biomedical test; and a microfluidic chip, comprising:

a top plate; and a microelectrode dot array, being arranged under the top plate, and a space being defined under the top plate and above the microelectrode dot array so that a test sample can be moved with the space under the control of the control apparatus, wherein the microelectrode dot array comprising a plurality of microelectrode devices connected in a series, and each of the microelectrode devices comprises:

a microfluidic electrode, being arranged under the top plate;

a multi-functional electrode, being arranged under the microfluidic electrode; and a control circuit, being arranged under the multi-functional electrode and comprising:

a microfluidic control and location-sensing circuit, being coupled to the microfluidic electrode;

a storage circuit; and a temperature control circuit, being coupled to the multi-functional electrode;

wherein the control apparatus provides a location-sensing signal to the microfluidic chip, the location-sensing signal is enabled within a first time interval, each of the microfluidic control and location-sensing circuits detects a first capacitance value between the top plate and the corresponding microfluidic electrode and stores the first capacitance value in the corresponding storage circuit during the first time interval, wherein the control apparatus further provides a clock signal to the microfluidic chip, the clock signal is enabled within a plurality of sub-time intervals of a second time interval, and the storage circuits output the first capacitance values during the sub-time intervals of the second time interval respectively, wherein the control apparatus further determines a size and a location of the test sample within the microfluidic chip according to the first capacitance values, generates a test control signal according to the test protocol, the size, and the location, and provides the test control signal to the microfluidic chip.

2. The microfluidic test system of claim 1, wherein the test control signal comprises a plurality of heating control configurations, the heating control configurations correspond to the microelectrode devices one-to-one, wherein the clock signal is enabled within a plurality of sub-time intervals of a third time interval, the storage circuits read in the heating control configurations during the sub-time intervals of the third time interval respectively, the control apparatus further provides a heating control signal to the microfluidic chip, the heating control signal is enabled within a fourth time interval, and each of the temperature control circuits determines an on/off status of the corresponding temperature control circuit according to the corresponding heating control configuration during the fourth time interval.

3. The microfluidic test system of claim 2, wherein the control apparatus generates a heating control pattern according to the test protocol, the size, and the location and generates the heating control configurations according to the heating control pattern.

4. The microfluidic test system of claim 3, wherein the heating control pattern comprises a heating area and an annular non-heating area, the annular non-heating area encompasses the heating area, and the location of the test sample corresponds to a center of the heating area.

5. The microfluidic test system of claim 1, wherein the test control signal comprises a plurality of sample operation configurations, the sample operation configurations correspond to the microelectrode devices one-to-one, wherein the clock signal is enabled within a plurality of sub-time intervals of a fifth time interval, the storage circuits read in the sample operation configurations during the sub-time intervals of the fifth time interval respectively, the control apparatus further provides a sample control signal to the microfluidic chip, the sample control signal is enabled within a sixth time interval, and each of the microfluidic control and location-sensing circuits functions or does not function according to the corresponding sample operation configuration during the sixth time interval.

6. The microfluidic test system of claim 5, wherein the control apparatus generates a sample control pattern according to the test protocol, the size, and the location and generates the sample operation configurations according to the sample control pattern.

7. The microfluidic test system of claim 1, wherein the location-sensing signal is enabled within a first sampling time of a seventh time interval, each of the microfluidic control and location-sensing circuits detects a second capacitance value between the top plate and the corresponding microfluidic electrode and stores the second capacitance value in the corresponding storage circuit during the first sampling time, the clock signal is enabled within a plurality of sub-time intervals of an eighth time interval, and the storage circuits output the second capacitance values during the sub-time intervals of the eight time interval respectively, wherein the location-sensing signal is enabled within a second sampling time of a ninth time interval, each of the microfluidic control and location-sensing circuits detects a third capacitance value between the top plate and the corresponding microfluidic electrode and stores the third capacitance value in the corresponding storage circuit during the second sampling time, the clock signal is enabled within a plurality of sub-time intervals of a tenth time interval, and the storage circuits output the third capacitance values during the sub-time intervals of the tenth time interval, wherein the first sampling time is deferred from a first starting point of the seventh time interval for a first defer time, the second sampling time is deferred from a second starting point of the ninth time interval for a second defer time, and the first defer time and the second defer time are different, wherein the control apparatus further generates a three-dimensional image of the test sample according to the second capacitance values and the third capacitance values.

8. The microfluidic test system of claim 1, wherein the location-sensing signal is enabled within a first sampling time of an eleventh time interval, each of the microfluidic control and location-sensing circuits detects a fourth capacitance value between the top plate and the corresponding microfluidic electrode and stores the fourth capacitance value in the corresponding storage circuit during the first sampling time, the clock signal is enabled within a plurality of sub-time intervals of a twelfth time interval, and the storage circuits output the fourth capacitance values during the sub-time intervals of the twelfth time interval respectively, wherein the location-sensing signal is enabled within a second sampling time of a thirteenth time interval, each of the microfluidic control and location-sensing circuits detects a fifth capacitance value between the top plate and the corresponding microfluidic electrode and stores the fifth capacitance value in the corresponding storage circuit during the second sampling time, the clock signal is enabled within a plurality of sub-time intervals of a fourteenth time interval, and the storage circuits output the fifth capacitance values during the sub-time intervals of the fourteenth time interval, wherein the first sampling time is deferred from a first starting point of the eleventh time interval for a first defer time, the second sampling time is deferred from a second starting point of the thirteenth time interval for a second defer time, and the first defer time and the second defer time are different, wherein for each of the microelectrode devices, the control apparatus further determines a status of the microelectrode device according to the fourth capacitance value and the fifth capacitance value corresponding to the microelectrode device.

9. The microfluidic test system of claim 8, wherein the control apparatus further determines a workable area of the microfluidic chip according to the statuses.

10. A microfluidic test method for use in a control apparatus of a microfluidic test system to control a microfluidic chip, the control apparatus storing a test protocol of a biomedical test, the microfluidic chip comprising a top plate and a microelectrode dot array, the microelectrode dot array being arranged under the top plate, a space being defined under the top plate and above the microelectrode dot array so that a test sample can be moved within the space under the control of the control apparatus, the microelectrode dot array comprising a plurality of microelectrode devices connected in a series, each of the microelectrode devices comprising a microfluidic electrode, a multi-functional electrode, and a control circuit, each of the microfluidic electrodes being arranged under the top plate, each of the multi-functional electrodes being arranged under the corresponding microfluidic electrode, each of the control circuits being arranged under the corresponding multi-functional electrode, each of the control circuits comprising a microfluidic control and location-sensing circuit, a storage circuit, and a temperature control circuit, each of the microfluidic control and location-sensing circuits being coupled to the corresponding microfluidic electrode, each of the temperature control circuits being coupled to the corresponding multi-functional electrode, and the microfluidic test method comprising the following steps:

(a) providing a location-sensing signal being enabled within a first time interval to the microfluidic chip so that each of the microfluidic control and location-sensing circuits detects a first capacitance value between the top plate and the corresponding microfluidic electrode and stores the first capacitance value in the corresponding storage circuit during the first time interval;

(b) providing a clock signal being enabled within a plurality of sub-time intervals of a second time interval to the microfluidic chip so that the storage circuits output the first capacitance values during the sub-time intervals of the second time interval respectively;

(c) receiving the first capacitance values from the microfluidic chip;

(d) determining a size and a location of the test sample within the microfluidic chip according to the first capacitance values;

(e) generating a test control signal according to the test protocol, the size, and the location; and (f) providing the test control signal to the microfluidic chip.

11. The microfluidic test method of claim 10, wherein the test control signal comprises a plurality of heating control configurations, the heating control configurations correspond to the microelectrode devices one-to-one, the clock signal is enabled within a plurality of sub-time intervals of a third time interval, the storage circuits read in the heating control configurations during the sub-time intervals of the third time interval respectively, and the microfluidic test method further comprises the following step:

providing a heating control signal being enabled within a fourth time interval to the microfluidic chip so that each of the temperature control circuits determines an on/off status of the corresponding temperature control circuit according to the corresponding heating control configuration during the fourth time interval.

12. The microfluidic test method of claim 11, wherein the step (e) comprises the following steps:

generating a heating control pattern according to the test protocol, the size, and the location; and generating the heating control configurations according to the heating control pattern.

13. The microfluidic test method of claim 12, wherein the heating control pattern comprises a heating area and an annular non-heating area, the annular non-heating area encompasses the heating area, and the location of the test sample corresponds to a center of the heating area.

14. The microfluidic test method of claim 10, wherein the test control signal comprises a plurality of sample operation configurations, the sample operation configurations correspond to the microelectrode devices one-to-one, the clock signal is enabled within a plurality of sub-time intervals of a fifth time interval, the storage circuits read in the sample operation configurations during the sub-time intervals of the fifth time interval respectively, and the microfluidic test method further comprises the following step:

providing a sample control signal being enabled within a sixth time interval to the microfluidic chip so that each of the microfluidic control and location-sensing circuits functions or does not function according to the corresponding sample operation configuration during the sixth time interval.

15. The microfluidic test method of claim 14, wherein the step (e) comprises the following steps:

generating a sample control pattern according to the test protocol, the size, and the location; and generating the sample operation configurations according to the sample control pattern.

16. The microfluidic test method of claim 10, wherein the location-sensing signal is enabled within a first sampling time of a seventh time interval, each of the microfluidic control and location-sensing circuits detects a second capacitance value between the top plate and the corresponding microfluidic electrode and stores the second capacitance value in the corresponding storage circuit during the first sampling time, the clock signal is enabled within a plurality of sub-time intervals of an eighth time interval, and the storage circuits output the second capacitance values during the sub-time intervals of the eight time interval respectively, wherein the location-sensing signal is enabled within a second sampling time of a ninth time interval, each of the microfluidic control and location-sensing circuits detects a third capacitance value between the top plate and the corresponding microfluidic electrode and stores the third capacitance value in the corresponding storage circuit during the second sampling time, the clock signal is enabled within a plurality of sub-time intervals of a tenth time interval, the storage circuits output the third capacitance values during the sub-time intervals of the tenth time interval, wherein the first sampling time is deferred from a first starting point of the seventh time interval for a first defer time, the second sampling time is deferred from a second starting point of the ninth time interval for a second defer time, the first defer time and the second defer time are different, and the microfluidic test method further comprises the following steps:

receiving the second capacitance values;

receiving the third capacitance values; and generating a three-dimensional image of the test sample according to the second capacitance values and the third capacitance values.

17. The microfluidic test method of claim 10, wherein the location-sensing signal is enabled within a first sampling time of an eleventh time interval, each of the microfluidic control and location-sensing circuits detects a fourth capacitance value between the top plate and the corresponding microfluidic electrode and stores the fourth capacitance value in the corresponding storage circuit during the first sampling time, the clock signal is enabled within a plurality of sub-time intervals of a twelfth time interval, and the storage circuits output the fourth capacitance values during the sub-time intervals of the twelfth time interval respectively, wherein the location-sensing signal is enabled within a second sampling time of a thirteenth time interval, each of the microfluidic control and location-sensing circuits detects a fifth capacitance value between the top plate and the corresponding microfluidic electrode and stores the fifth capacitance value in the corresponding storage circuit during the second sampling time, the clock signal is enabled within a plurality of sub-time intervals of a fourteenth time interval, and the storage circuits output the fifth capacitance values during the sub-time intervals of the fourteenth time interval, wherein the first sampling time is deferred from a first starting point of the eleventh time interval for a first defer time, the second sampling time is deferred from a second starting point of the thirteenth time interval for a second defer time, the first defer time and the second defer time are different, and the microfluidic test method further comprises the following steps:

receiving the fourth capacitance values;

receiving the fifth capacitance values; and determining a status of each of the microelectrode device according to the corresponding fourth capacitance value and the corresponding fifth capacitance value.

18. The microfluidic test method of claim 17, further comprising the following step:

determining a workable area of the microfluidic chip according to the statuses.

* * * * *